United States Patent
Choi et al.

(10) Patent No.: US 9,564,130 B2
(45) Date of Patent: Feb. 7, 2017

(54) WIRELESS CONTROLLER INCLUDING INDICATOR

(71) Applicant: SAMSUNG ELECTRONICS CO., LTD., Suwon-si, Gyeonggi-do (KR)

(72) Inventors: Sang Hwa Choi, Seoul (KR); Bo Kyung Kim, Seoul (KR); Ji Ho Seo, Suwon-si (KR); Chang Wook Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/956,551

(22) Filed: Dec. 2, 2015

(65) Prior Publication Data

US 2016/0163315 A1 Jun. 9, 2016

(30) Foreign Application Priority Data

Dec. 3, 2014 (KR) .................. 10-2014-0171972
Sep. 24, 2015 (KR) .................. 10-2015-0135151

(51) Int. Cl.
*G10L 15/22* (2006.01)
*G06F 3/16* (2006.01)
*H04W 4/00* (2009.01)
*H04L 12/24* (2006.01)

(52) U.S. Cl.
CPC ............ *G10L 15/22* (2013.01); *G06F 3/167* (2013.01); *H04L 41/22* (2013.01); *H04W 4/003* (2013.01); *H04W 4/008* (2013.01); *G10L 2015/221* (2013.01); *G10L 2015/223* (2013.01)

(58) Field of Classification Search
USPC ......... 704/275, 231–257; 348/211.1–211.14, 348/211.99; 725/37–40, 334; 455/418–420; 715/700–867
See application file for complete search history.

(56) References Cited

U.S. PATENT DOCUMENTS

| | | | | |
|---|---|---|---|---|
| 5,774,841 | A * | 6/1998 | Salazar | G10L 15/22 704/225 |
| 6,947,731 | B1 * | 9/2005 | Kamperschroer | H04L 67/36 340/426.13 |
| 2002/0123896 | A1 * | 9/2002 | Diez | F24F 11/006 704/275 |
| 2011/0282673 | A1 * | 11/2011 | Di Profio | G06F 3/017 704/275 |
| 2013/0235222 | A1 * | 9/2013 | Karn | H04N 5/23241 348/211.2 |
| 2014/0207452 | A1 * | 7/2014 | Klein | G06F 3/0304 704/235 |
| 2014/0214430 | A1 * | 7/2014 | Wang | G10L 21/10 704/275 |

* cited by examiner

*Primary Examiner* — Abul Azad
(74) *Attorney, Agent, or Firm* — Staas & Halsey LLP

(57) ABSTRACT

Embodiments disclosed herein provide a wireless controller which shows a voice, motion, or an image complying with or not complying with a user's command and controls an external device in accordance with the user's command. According to an embodiment, a wireless controller includes a main body provided in a shape of a flowerpot, and includes a voice recognition unit, a control unit generating a signal for controlling an object to be controlled, which is designated by a voice recognized in the voice recognition unit, in accordance with the voice, and a communication unit outputting the control signal generated in the control unit to the object to be controlled; and an indicator provided at the main body in a shape of at least one of a stem, a leaf, a flower, and a tree, and showing a motion corresponding to the voice recognized in the voice recognition unit.

30 Claims, 34 Drawing Sheets

WIRELESS CONTROLLER INCLUDING INDICATOR

CROSS-REFERENCE TO RELATED APPLICATIONS

This application claims the benefit of Korean Patent Application Nos. 10-2014-0171972 filed on Dec. 3, 2014 and 10-2015-0135151 filed on Sep. 24, 2015 in the Korean Intellectual Property Office, the disclosures of which are incorporated herein by reference.

BACKGROUND

1. Field

The present disclosure relates to a wireless controller which remotely controls an external device.

2. Description of the Related Art

Recently, technologies related to the Internet of Things are being developed. However, it is difficult to apply Internet of Things technologies to existing home appliances which were released or sold before the Internet of Things technologies were developed. Recently, attempts to apply the Internet of Things technologies to existing home appliances are being made.

SUMMARY

Embodiments disclosed herein provide a wireless controller that shows whether or not a voice, motion, or an image comply with a user's command, and controls an external device in accordance with the user's command.

According to an embodiment, a wireless controller includes a main body provided in a shape of a flowerpot, and including a voice recognition unit, a control unit generating a signal for controlling an object to be controlled, which is designated by a voice recognized in the voice recognition unit, in accordance with the voice, and a communication unit outputting the control signal generated in the control unit to the object to be controlled; and an indicator provided at the main body in a shape of at least one of a stem, a leaf, a flower, and a tree, and showing a motion corresponding to the voice recognized in the voice recognition unit.

In addition, the main body may further include a speaker outputting as a sound whether the control in accordance with the voice has been performed or a result of the performance.

In addition, the speaker may output a voice which complies with a command in accordance with the voice recognized in the voice recognition unit.

In addition, the speaker may output a voice which does not comply with the command in accordance with the voice recognized in the voice recognition unit.

In addition, the indicator may include a first indicator showing a motion corresponding to the voice recognized in the voice recognition unit, and a second indicator which includes a display device showing a motion corresponding to the voice recognized in the voice recognition unit and displaying an image corresponding to the voice recognized in the voice recognition unit.

In addition, the indicator may include a first indicator showing a motion corresponding to the voice recognized in the voice recognition unit, and a second indicator which includes a support unit provided such that the display device showing a motion corresponding to the voice recognized in the voice recognition unit and displaying an image corresponding to the voice recognized in the voice recognition unit is detachable.

The indicator may include a display device displaying an image corresponding to the voice recognized in the voice recognition unit.

The indicator may be provided to be input with a command for controlling the object to be controlled through a manipulation in accordance with a predetermined manipulation method.

In addition, when the command through the indicator is input, the control unit may generate the control signal for controlling the object to be controlled in accordance with the input command.

In addition, the display device may display as an image or a text whether the control in accordance with the voice has been performed or a result of the performance.

In addition, the display device may display an image or a text which complies with the command in accordance with the voice recognized in the voice recognition unit.

In addition, the display device may display an image or a text which does not comply with the command in accordance with the voice recognized in the voice recognition unit.

In addition, the indicator may show a motion which complies with the command in accordance with the voice recognized in the voice recognition unit.

In addition, the indicator may show a motion which does not comply with the command in accordance with the voice recognized in the voice recognition unit.

In addition, the communication unit may perform communication with the object to be controlled using one of wireless fidelity (Wi-Fi), Bluetooth, ZigBee, radio frequency (RF), and infrared (IR) communication methods.

In addition, the main body may further include a sensor which detects information around the wireless controller.

In addition, the sensor may include at least one of a temperature sensor, a humidity sensor, a dust sensor, a gas sensor, and an illuminance sensor.

In addition, the control unit may generate the control signal for controlling the object to be controlled based on information detected in the sensor.

In addition, the main body may further include a main body display unit displaying an image corresponding to the voice recognized in the voice recognition unit.

In addition, the main body display unit may display as an image whether the control in accordance with the voice has been performed or a result of the performance.

In addition, the main body display unit may display an image which complies with the command in accordance with the voice recognized in the voice recognition unit.

In addition, the main body display unit may display an image which does not comply with the command in accordance with the voice recognized in the voice recognition unit.

In addition, the main body may further include an extension terminal provided to connect the main body with an external device.

According to another embodiment, a method of controlling an external device using a hardware-based controller having a movable indicator may be provided. The method may include recognizing an input voice command using the controller, selecting a motion from a plurality of motions that the indicator is configured to perform, the indicator being configured to appear like a natural object, associating the selected motion with the recognized voice command and controlling the indicator to perform the selected motion, thereby indicating that the voice command has been recognized, and generating, using the controller, a control signal to control the external device to perform a task that corresponds to the recognized input voice command.

According to an embodiment, a wireless controller for controlling an external device may include a voice recognizer to recognize an input voice command, a movable indicator configured to appear like a natural object, a hardware-based controller to select a motion from a plurality of motions that the indicator is configured to perform, to associate the selected motion with the recognized voice command, and to control the indicator to perform the selected motion, thereby indicating that the voice command has been recognized, and a communication unit to generate a control signal to control the external device to perform a task that corresponds to the recognized input voice command.

Additional aspects and/or advantages will be set forth in part in the description which follows and, in part, will be apparent from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, disclosed embodiments will be described in detail with respect to the accompanying drawings.

Figure 1:
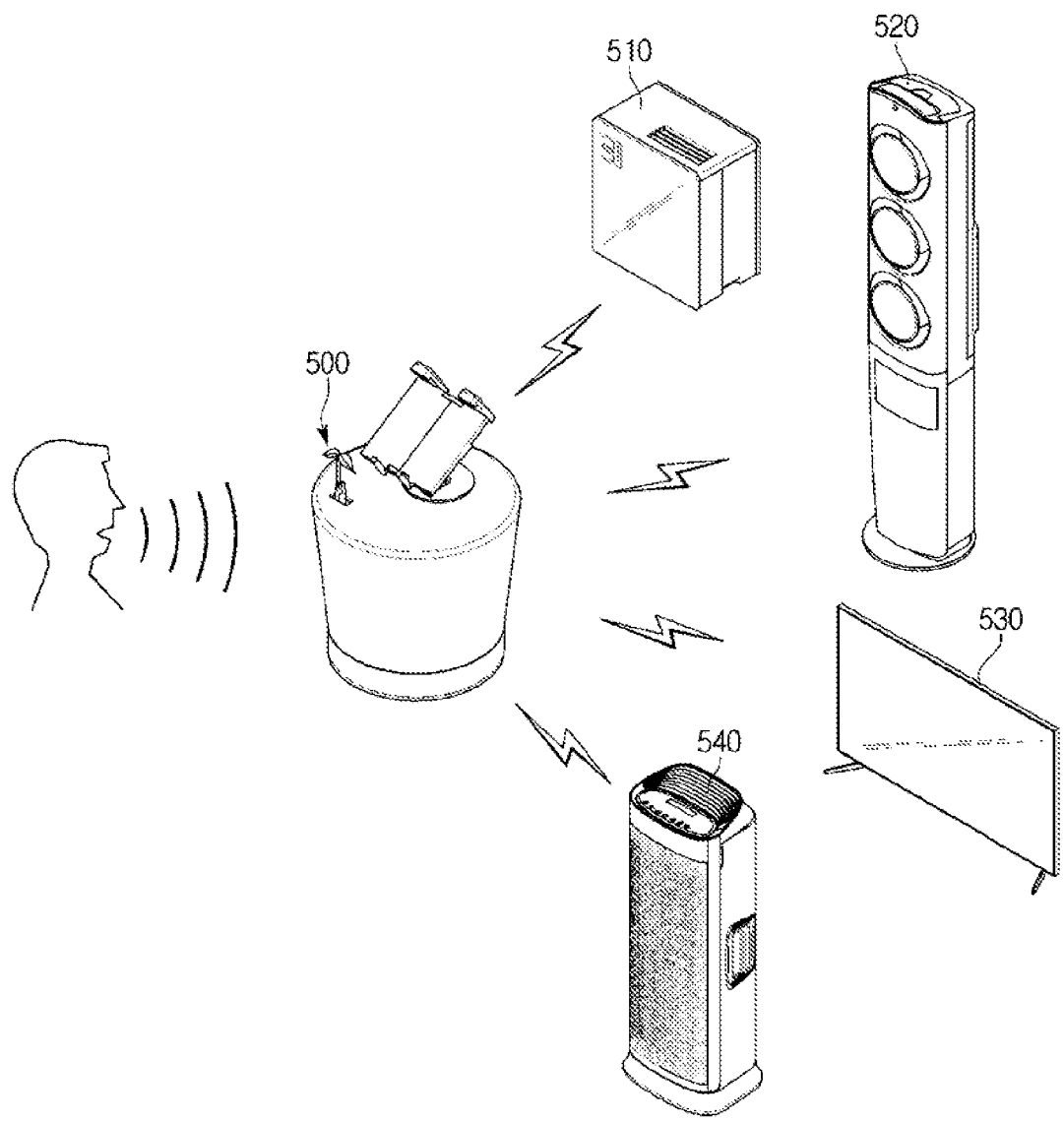
FIG. 1 is a view schematically illustrating a method of controlling an external device by a plant-like wireless controller according to a disclosed embodiment.
Figure 2:
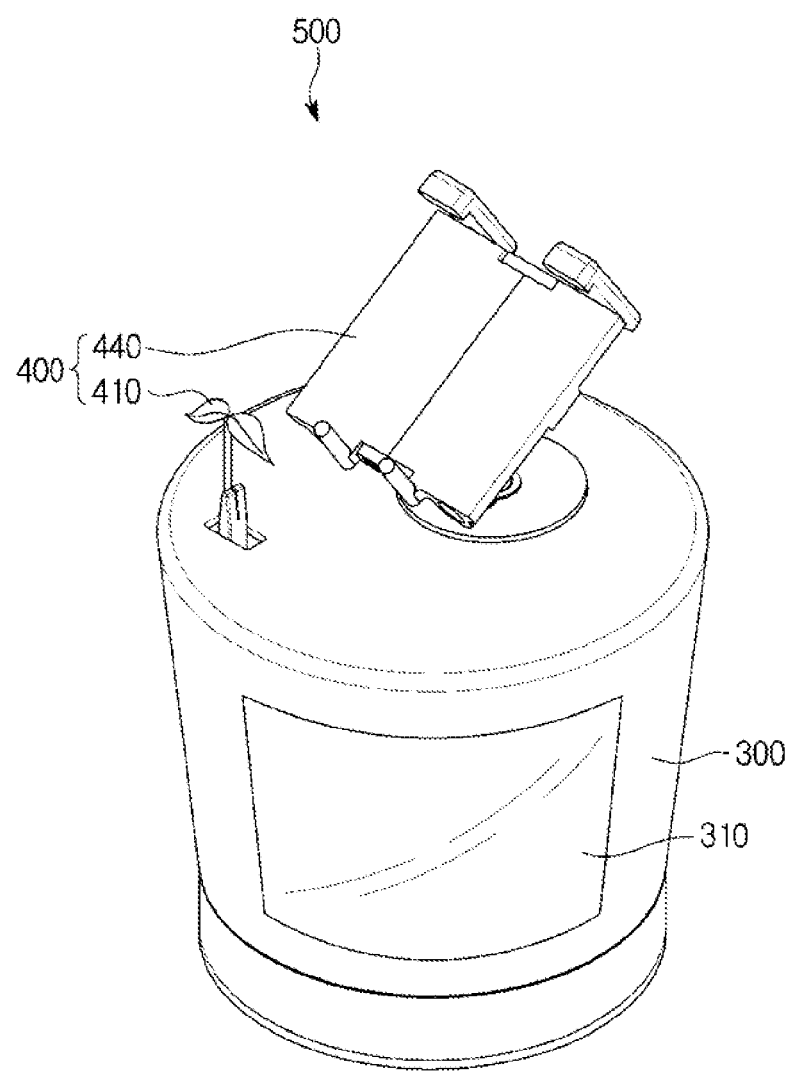
FIG. 2 is a perspective view of the plant-like wireless controller according to a disclosed embodiment.
Figure 3:
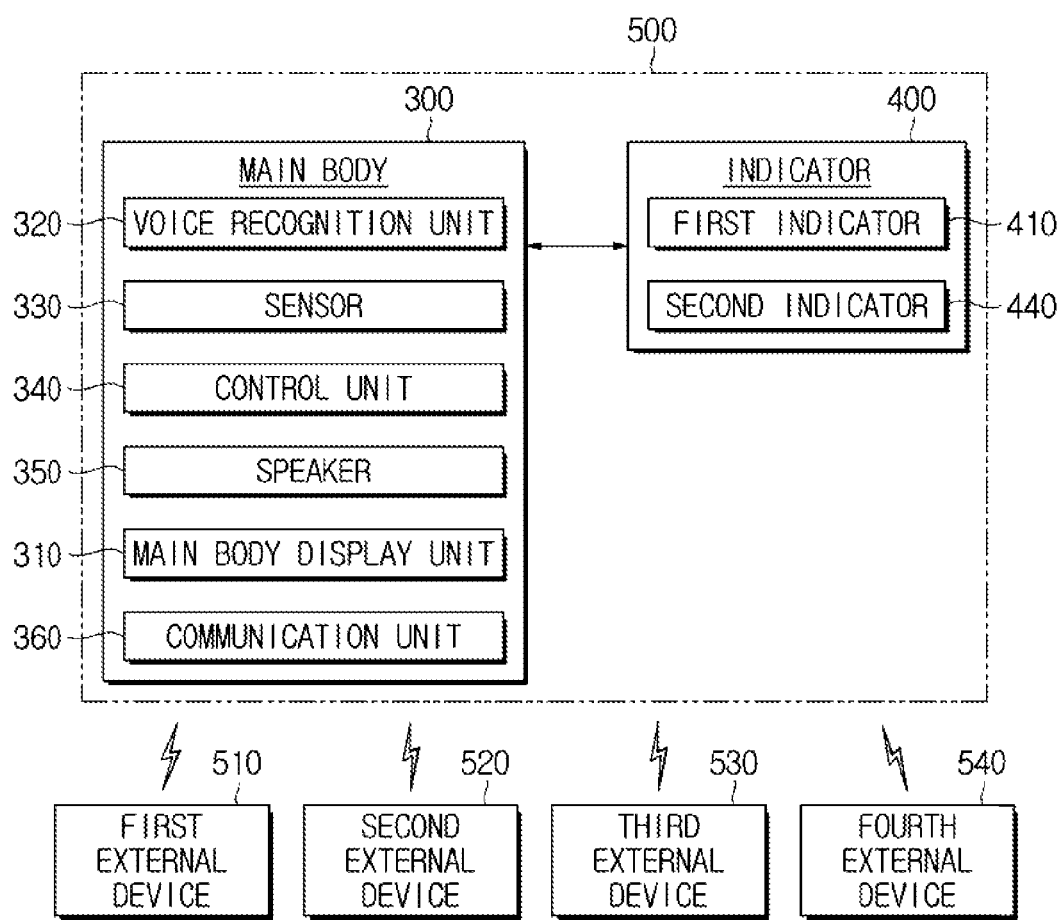
FIG. 3 is a control block diagram of a wireless controller according to a disclosed embodiment.

FIG. 1 is a view schematically illustrating a method of controlling an external device by a plant-like wireless controller according to a disclosed embodiment, FIG. 2 is a perspective view of the plant-like wireless controller according to a disclosed embodiment, and FIG. 3 is a control block diagram of a wireless controller according to a disclosed embodiment.

As illustrated in FIG. 1, a wireless controller 500 according to a disclosed embodiment may recognize a command, e.g., a voice command, from a user and control external devices such as external devices 510, 520, 530, and 540 designated by the recognized voice command in accordance with the voice command. For example, when the user says "Turn on the TV," the wireless controller 500 according to a disclosed embodiment recognizes the user's voice, determines the TV as an object to be controlled, and transmits a control signal for turning on the TV to the TV.

As illustrated in FIG. 1, external devices that can be controlled by the wireless controller 500 may include home appliances such as an air conditioner 520, a television 530, an air purifier 540, and a humidifier 510. The external devices 510, 520, 530, and 540 that can be controlled by the wireless controller 500 are not limited to those mentioned above, and any device with a function capable of performing wired or wireless communication with the wireless controller 500 may be included in the external devices 510, 520, 530, and 540 that can be controlled by the wireless controller 500.

As illustrated in FIG. 1, the wireless controller 500 according to a disclosed embodiment may have a plant shape, e.g., may be configured to appear like a plant such as to take the shape of a flowerpot and a leaf growing from the flowerpot. The shape illustrated in FIG. 1 is only one example, and the wireless controller 500 according to a disclosed embodiment may have a shape of a plant such as a flower, a leaf, a stem, and a tree, or have a shape in which the above shapes are combined. For example, similar to a dracaena, a main body 300 may be provided in a shape of a tree, and an indicator 400 may be provided in a shape of a leaf formed on the tree. As mentioned above, the wireless controller 500 according to a disclosed embodiment may be provided in a shape of a nature-friendly plant so that a user may feel familiarity with the plant. In addition, the wireless controller 500 according to a disclosed embodiment uses the plant shape to show an intuitive response corresponding to a user's command or a change in a surrounding environment, such that a user is able to intuitively recognize whether the user's command has been performed or the change in the surrounding environment. This will be described in detail below.

As illustrated in FIG. 2 and FIG. 3, the wireless controller 500 according to a disclosed embodiment includes the main body 300 formed in the shape of a flowerpot, and the indicator 400 provided at the main body 300 and formed in the shape of a leaf.

In more detail, the main body 300 may include a voice recognition unit 320 provided to recognize a user's voice, a sensor 330 capable of detecting information such as a temperature or humidity around the wireless controller 500, a control unit 340 controlling the indicator 400 in accordance with the voice recognized in the voice recognition unit 320 and the information detected in the sensor 330 and generating a signal for controlling the external devices 510, 520, 530, and 540, a speaker 350 outputting a sound corresponding to the voice recognized in the voice recognition unit 320 or the information detected in the sensor 330, a main body display unit 310 displaying an image corresponding to the voice recognized in the voice recognition unit 320 or the information detected in the sensor 330, and a communication unit 360 performing communication with the external devices 510, 520, 530, and 540. In addition, the main body 300 may further include an extension terminal provided to connect the main body 300 with the external devices 510, 520, 530, and 540 or an external storage medium, and the like.

The indicator 400 may include a first indicator 410 provided in the shape of a leaf or a rod and showing a motion corresponding to the voice recognized in the voice recognition unit 320 or the information detected in the sensor 330, and a second indicator 440 provided in the shape of a stem and including a support unit capable of mounting a display device such as a cellphone at an end portion thereof. Alternatively, the second indicator 440 may include a display unit integrally provided with the second indicator 440 together with a mounting stand capable of mounting a display device. In another embodiment, the second indicator 440 may include only the integrally provided display unit without the above-mentioned mounting stand. Hereinafter, a case of including the mounting stand will be described as one example of the second indicator 440.

The voice recognition unit 320 may include a microphone (not shown) which converts a user's voice signal to an electrical signal and provides the signal to the control unit 340. In addition, the voice recognition unit 320 may further include an amplifier (not shown) which amplifies the electrical signal output by the microphone (not shown). The voice recognition unit 320 may be provided by being embedded in the main body 300, and the microphone which obtains the user's voice may be provided to be exposed at an outer surface of the main body 300.

The sensor 330 may include various sensors capable of detecting information about the surrounding environment of the wireless controller 500. The sensor 330 may include a temperature sensor capable of detecting a temperature around the wireless controller 500, a humidity sensor capable of detecting humidity around the wireless controller 500, a dust sensor or a gas sensor capable of detecting a quality of air around the wireless controller 500, a luminance sensor capable of detecting brightness around the wireless controller 500, and the like. The above-mentioned types of sensors are only examples, and the wireless controller 500 according to a disclosed embodiment may further include various other types of sensors capable of detecting various information on a space in which the wireless controller 500 is provided.

The information detected in the sensor 330 may be provided to the control unit 340 to be used in generating a signal for controlling the external devices 510, 520, 530, and 540. For example, the information detected in the temperature sensor or the humidity sensor may be used in generating a signal required for controlling the air conditioner 520 or a dehumidifier, and the information detected in the gas sensor or the dust sensor may be used in generating a signal required for controlling the air purifier 540.

The speaker 350 may convert an electrical signal generated in the control unit 340 into a voice signal, and further include the amplifier (not shown) which amplifies the electrical signal provided from the control unit 340.

The communication unit 360 may include a wireless communication module which uses wireless communication methods such as wireless fidelity (Wi-Fi), Bluetooth, ZigBee, near field communication (NFC), radio frequency (RF) communication, infrared (IR) communication, and the like to perform communication with the external devices 510, 520, 530, and 540. The communication unit 360 transmits the control signal generated in the control unit 340 to the external devices 510, 520, 530, and 540 which correspond to an object to be controlled.

The first indicator 410 may show various motions. The indicator provided in the shape of a leaf will be described as an example with respect to the various motions shown by the first indicator 410. FIGS. 4 to 7 are views illustrating motions of the first indicator 410 of the wireless controller 500 according to disclosed embodiments.

Figure 4:
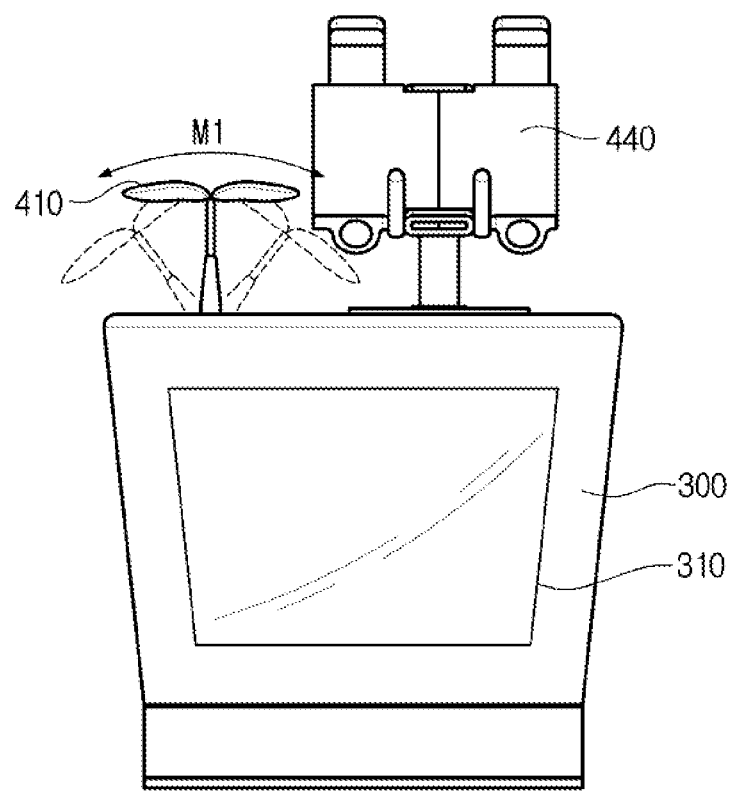
FIGS. 4, 5, 6, and 7 are views illustrating motions of a first indicator of the wireless controller according to disclosed embodiments.

Referring to FIG. 4, the stem portion of the first indicator 410 provided in the shape of a leaf may be provided to perform a motion of tilting or being tilted by a predetermined angle in any one direction of directions opposite to each other, such as left and right directions, a motion of being tilted by a predetermined angle in any one direction of directions opposite to each other and being tilted by a predetermined angle in the other direction, or a motion repeating being tilted by a predetermined angle in any one direction of directions opposite to each other and being tilted by a predetermined angle in the other direction one or more times. The above-mentioned left and right directions are only one example, and the directions opposite to each other are not limited thereto. Hereinafter, the above-mentioned motion is called a first motion M1. An angle by which the first indicator 410 is tilted during the first motion M1 and a speed of the motion may be predetermined or adjusted by the control unit 340. A motor which provides a power required for the above-mentioned first motion M1 of the first indicator 410 may be provided in the main body 300.

Figure 5:
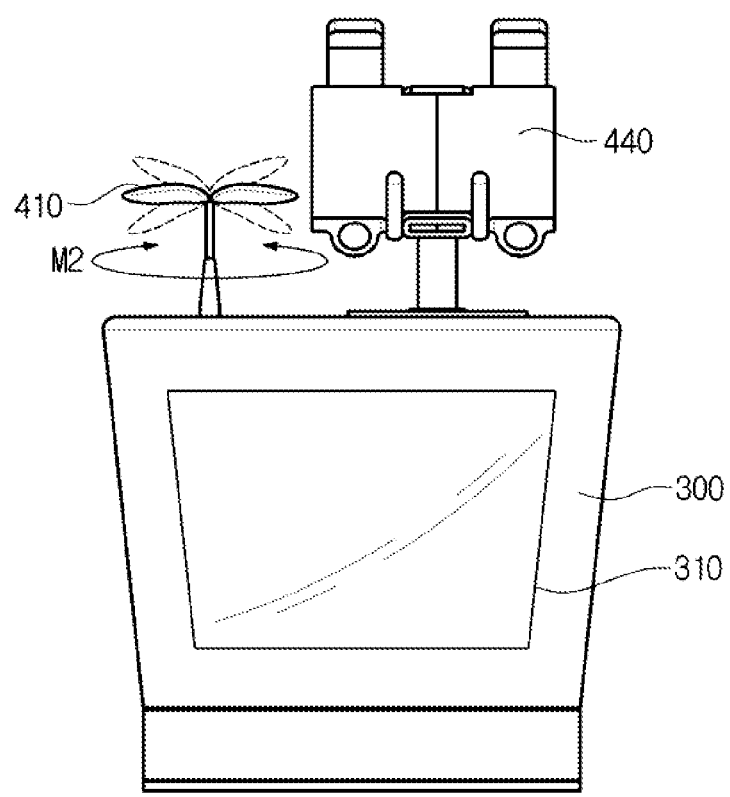

In addition, referring to FIG. 5, the stem portion of the first indicator 410 may be provided to perform a motion of rotating clockwise by a predetermined angle while having the stem as a rotary shaft, a motion of rotating counterclockwise by a predetermined angle, a motion of rotating clockwise by a predetermined angle and rotating counterclockwise by a predetermined angle, or a motion of repeating clockwise and counterclockwise rotations. Hereinafter, the above-mentioned motion is called a second motion M2. An angle by which the first indicator 410 rotates during the second motion M2 and a speed of the rotation may be predetermined or adjusted by the control unit 340. A motor which provides a power required for the above-mentioned second motion M2 of the first indicator 410 may be provided in the main body 300.

Figure 6:
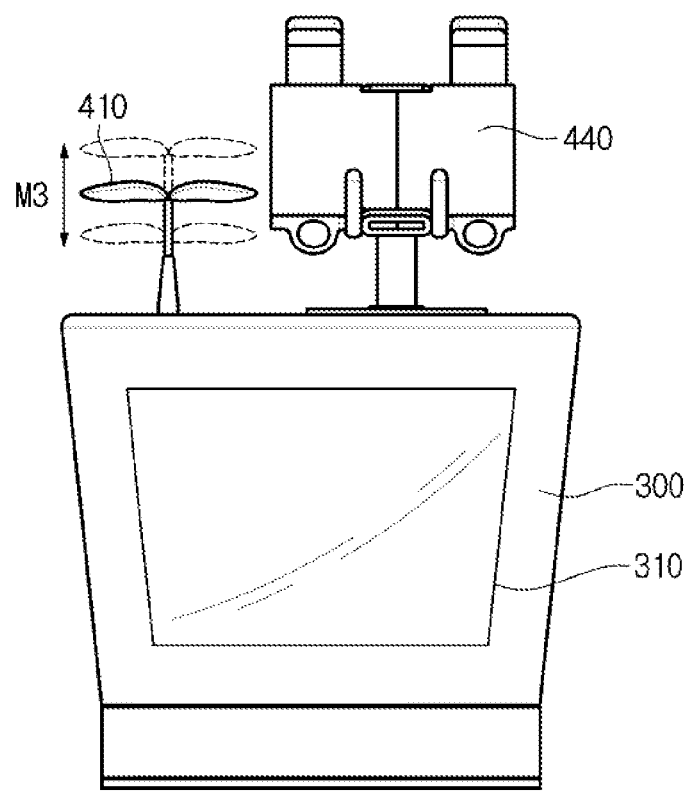

In addition, referring to FIG. 6, the stem portion of the first indicator 410 may be provided to perform a motion of ascending by a predetermined distance, a motion of descending by a predetermined distance, a motion of ascending by a predetermined distance and descending by a predetermined distance, or a motion of repeating the ascending and descending. Hereinafter, the above-mentioned motion is called a third motion M3. Ascending and descending distances of the first indicator 410 during the third motion M3 and a speed of the ascending and descending may be predetermined or adjusted by the control unit 340. A motor which provides a power required for the above-mentioned third motion M3 of the first indicator 410 may be provided in the main body 300.

Figure 7:
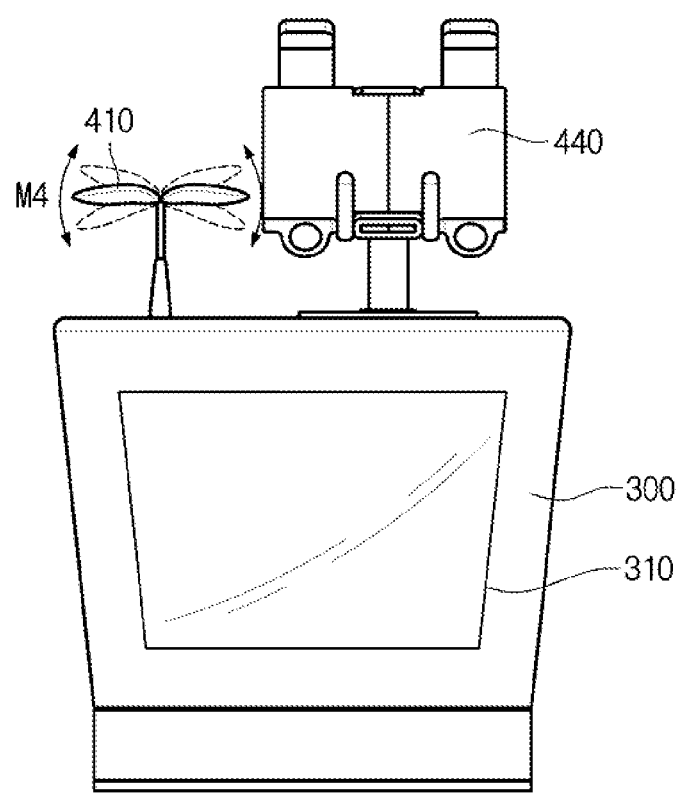

In addition, referring to FIG. 7, a leaf portion of the first indicator 410 may be provided to perform a motion of being tilted by a predetermined angle in any one direction of directions opposite to each other, such as top and bottom directions, or a motion of repeating being tilted by a predetermined angle in any one direction of directions opposite to each other and being tilted by a predetermined angle in the other direction one or more times. The above-mentioned top and bottom directions are only one example, and the directions opposite to each other are not limited thereto. Also, when two or more leaves are present, only one leaf may show the above-mentioned motion, the two or more leaves may show the above-mentioned motion in the same direction, or at least one leaf among the two or more leaves may show the above-mentioned motion in the other direction. Hereinafter, the above-mentioned motion is called a fourth motion M4. An angle by which the first indicator 410 is tilted during the fourth motion M4 and a speed of the motion may be predetermined or adjusted by the control unit 340. A motor which provides a power required for the above-mentioned fourth motion M4 of the first indicator 410 may be provided in the main body 300.

Two or more of the above-mentioned motions of the first indicator 410 may be combined and performed, or only one motion may be shown at a time. In addition, the above-mentioned first motion M1 to the fourth motion M4 are only examples, and the first indicator 410 may show other types of motions. The first indicator 410 shows the above-mentioned motions corresponding to a user's voice command, thereby enabling the user to intuitively recognize that the wireless controller 500 is responding to the user's voice command.

Figure 8:
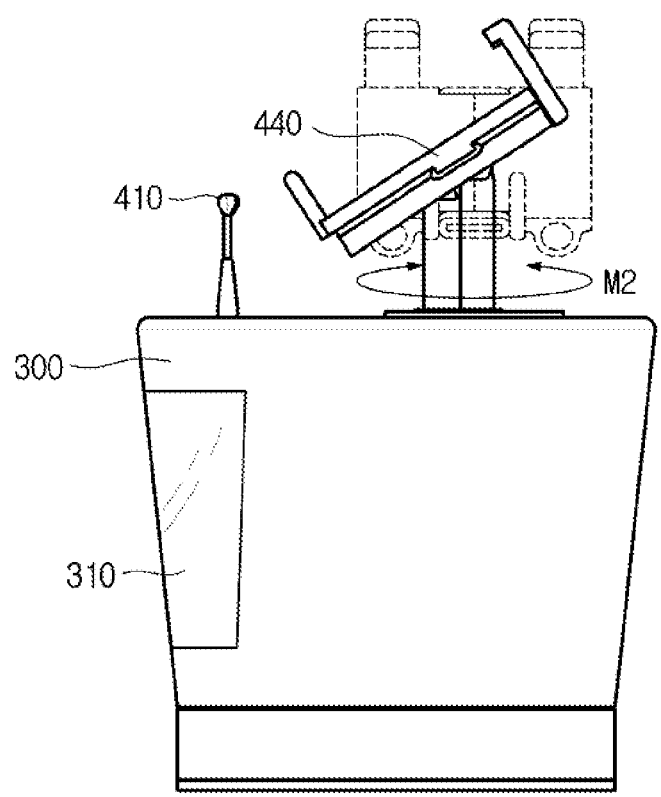
FIGS. 8, 9, and 10 are views illustrating motions of a second indicator of the wireless controller according to disclosed embodiments.
Figure 9:
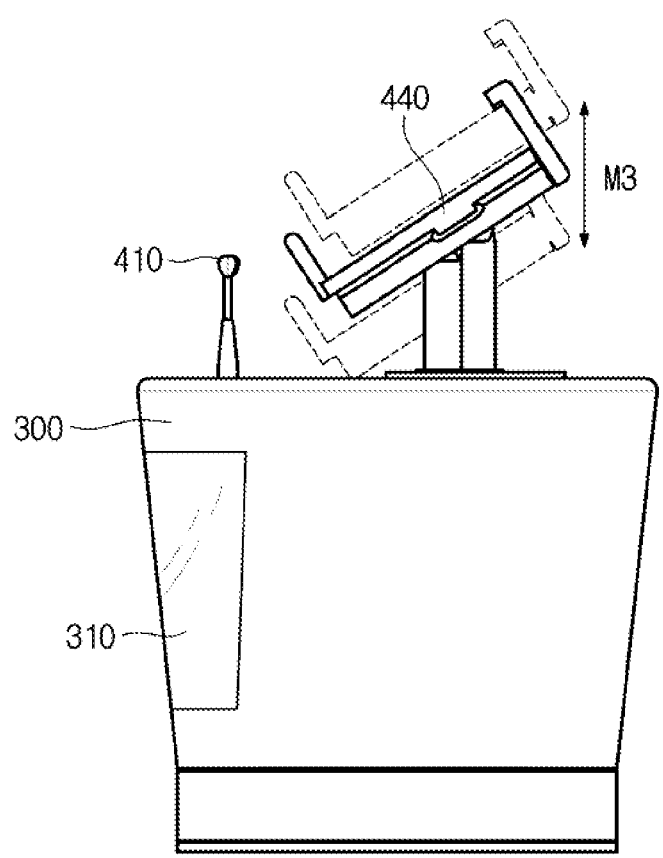
Figure 10:
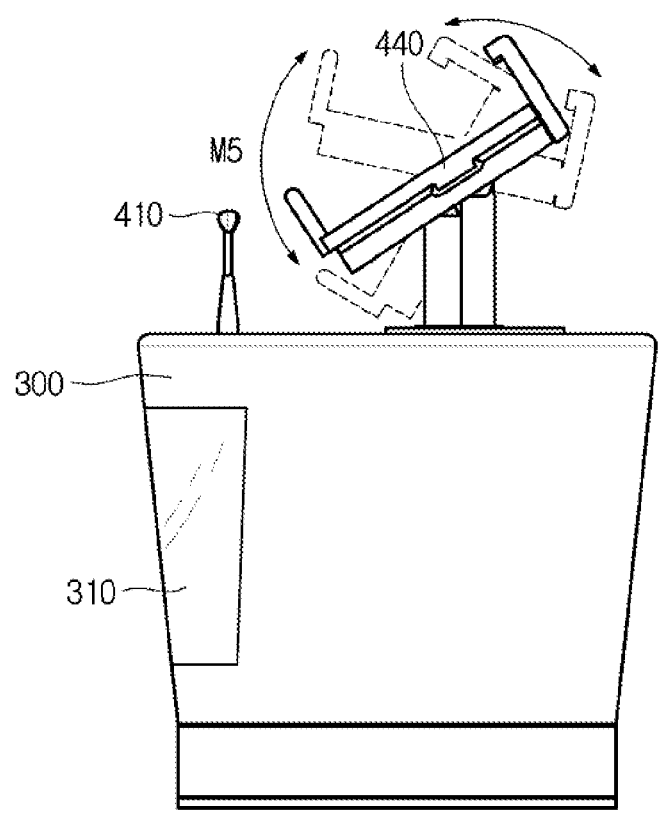

The second indicator 440 may also show various motions. FIGS. 8 to 10 are views illustrating motions of the second indicator 440 of the wireless controller 500 according to disclosed embodiments.

Referring to FIG. 8, a stem portion of the second indicator 440 may be provided to perform a motion of rotating clockwise by a predetermined angle while having the stem as a rotary shaft, a motion of rotating counterclockwise by a predetermined angle, a motion of rotating clockwise by a predetermined angle and rotating counterclockwise by a predetermined angle, or a motion of repeating clockwise and counterclockwise rotations. In other words, the second indicator 440 may also be provided to perform the second motion M2 like the first indicator 410. An angle by which the second indicator 440 rotates during the second motion M2 and a speed of the rotation may be predetermined or adjusted by the control unit 340. A motor which provides a power required for the above-mentioned second motion M2 of the second indicator 440 may be provided in the main body 300.

In addition, referring to FIG. 9, the stem portion of the second indicator 440 may be provided to perform a motion of ascending by a predetermined distance, a motion of descending by a predetermined distance, a motion of ascending by a predetermined distance and descending by a predetermined distance, or a motion of repeating the ascending and descending. In other words, the second indicator 440 may also be provided to perform the third motion M3 like the first indicator 410. Ascending and descending distances of the second indicator 440 during the third motion M3 and a speed of the ascending and descending may be predetermined or adjusted by the control unit 340. A motor which provides a power required for the above-mentioned third motion M3 of the second indicator 440 may be provided in the main body 300.

In addition, referring to FIG. 10, a support unit provided at the stem portion of the second indicator 440 may be rotatably provided at the stem portion. In other words, as illustrated in FIG. 10, the support unit may be provided to perform a motion of being tilted by a predetermined angle in any one direction of directions opposite to each other, such as top and bottom directions, or a motion of repeating being tilted by a predetermined angle in any one direction of the top and bottom directions opposite to each other and being tilted by a predetermined angle in the other direction one or more times. Hereinafter, the above-mentioned motion is called a fifth motion M5. An angle by which the support unit of the second indicator 440 is tilted during the fifth motion M5 and a speed of the motion may be predetermined or adjusted by the control unit 340. A motor which provides a power required for the above-mentioned fifth motion M5 of the support unit of the second indicator 440 may be provided in the main body 300.

As mentioned above, the indicator 400 may be provided not only to show responses to the user's voice command with motions but also to enable the user to input a desired command through a predetermined manipulation. For example, through a manipulation of lifting or lowering the leaf portion of the first indicator 410, i.e. a manipulation corresponding to the above-mentioned fourth motion M4, the user may input commands to adjust a temperature of an air conditioner or change a channel of the television 530, and the like. Various manipulation methods for controlling the external devices 510, 520, 530, and 540 through the indicator 400 may be preset and stored in the wireless controller 500, and the user may input a desired command not only through a voice command but also through manipulation of the indicator 400. In addition, the user may input a desired command by combining the voice command and the manipulation of the indicator 400. For example, the user may say "television channel," and manipulate the leaf portion of the first indicator 410 through a manipulation method corresponding to the fourth motion M4 to input a command to change a channel of the television 530. Ways of manipulating the indicator 400 are not limited to the above-mentioned examples, and the indicator 400 may be manipulated in various ways.

After receiving the voice command recognized in the voice recognition unit 320 or a command through the manipulation of the indicator 400, the control unit 340 of the wireless controller 500 according to a disclosed embodiment determines an object to be controlled, which is designated by the received command, and generates a control signal for controlling the determined object to be controlled in accordance with the received command. The control unit 340 transmits the generated control signal to the external devices 510, 520, 530, and 540, which are objects to be controlled, through the communication unit 360, such that the external devices 510, 520, 530, and 540 are controlled in accordance with the user's command. Also, when the external devices 510, 520, 530, and 540 that have received the control signal operate in accordance with the received control signal, the control unit 340 of the wireless controller 500 outputs a voice saying that the user's command has been performed through the speaker 350, thereby informing the user of the performance of the command. Or the control unit 340 of the wireless controller 500 may operate the indicator 400 in a set motion so that the user can intuitively recognize that the user's command has been performed, thereby informing the user of the performance of the command. Or the control unit 340 of the wireless controller 500 may display a set image, or the like, through the main body display unit 310 of the wireless controller 500 or the display device mounted on the support unit of the second indicator 440 so that the user can intuitively recognize that the user's command has been performed, thereby informing the user of the performance of the command. Or the control unit 340 of the wireless controller 500 may combine the voice output through the speaker 350 with one or more of the motion of the indicator 400, and the displaying of an image through the main body display unit 310 or the display device mounted on the support unit to inform the user of the performance of the command.

Hereinafter, operations of the wireless controller 500 according to a disclosed embodiment will be described in detail with reference to FIGS. 11 to 17. FIGS. 11 to 17 are views illustrating examples of operating the wireless controller 500 according to disclosed embodiments related to the controlling of the external devices 510, 520, 530, and 540.

Figure 11:
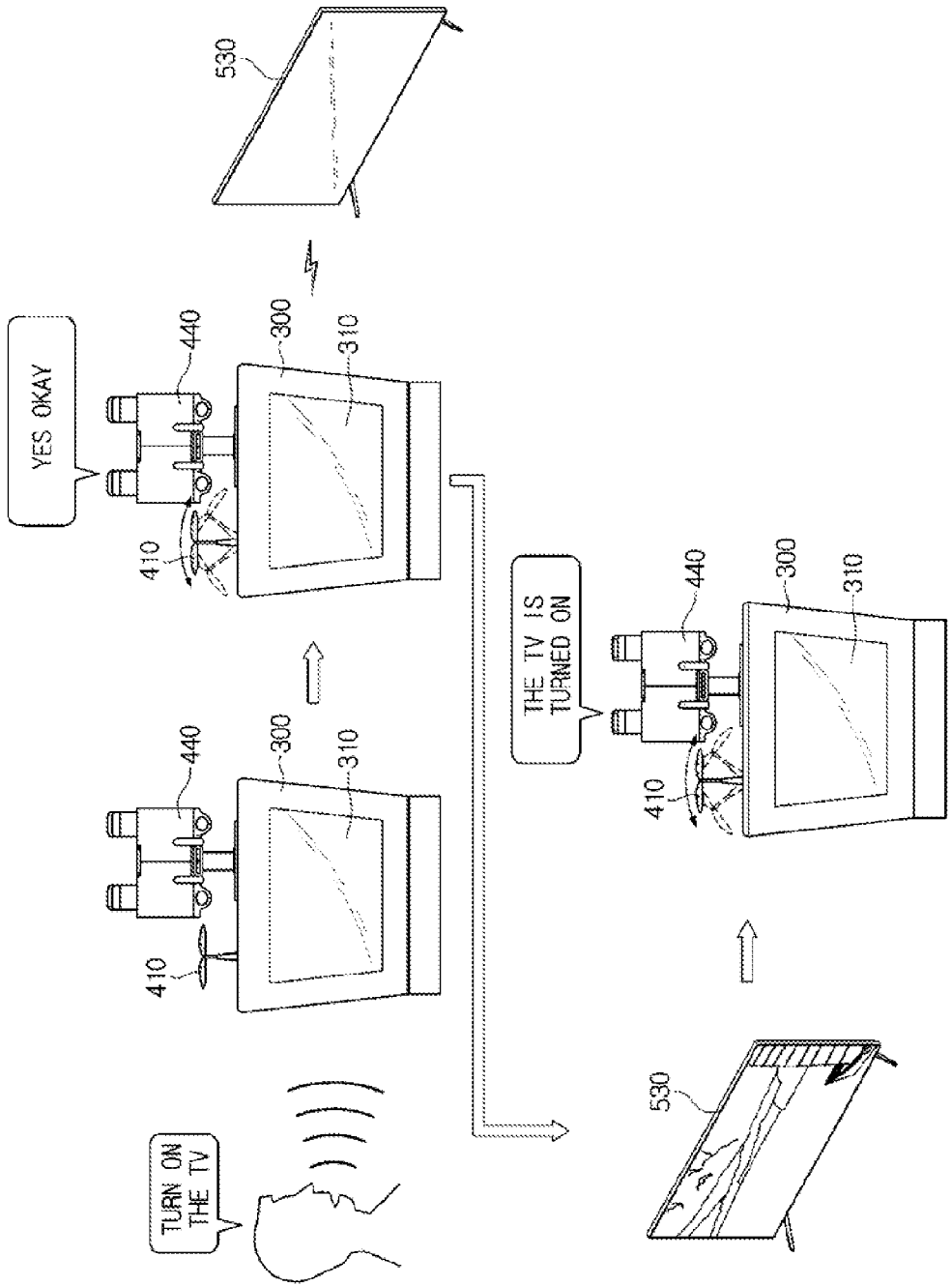
FIGS. 11, 12, 13, 14, 15, 16, and 17 are views illustrating examples of operating the wireless controller according to disclosed embodiments related to the controlling of the external device.

Referring to FIG. 11, when the user says "Turn on the TV" to turn on the television 530, the voice recognition unit 320 of the wireless controller 500 according to a disclosed embodiment recognizes the user's voice saying "Turn on the TV." To enable the user to recognize that the wireless controller 500 is responding to the user's voice command recognized in the voice recognition unit 320, the control unit 340 of the wireless controller 500 outputs a voice saying "Yes, okay" through the speaker 350 of the wireless controller 500.

Also, the control unit 340 of the wireless controller 500 controls the indicator 400 such that the indicator 400 of the wireless controller 500 can show a predetermined motion, thereby enabling the user to recognize that the wireless controller 500 is responding to the user's voice command. For example, the first indicator 410 may show the above-mentioned first motion M1 or the fourth motion M4, thereby enabling the user to intuitively recognize that the wireless controller 500 has recognized the user's voice command. Besides the first indicator 410, the second indicator 440 may also show the fifth motion M5 illustrated in FIG. 10. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the speaker 350 and the indicator 400 to only show the motion of the indicator 400 or only output a voice, or control both of the speaker 350 and the indicator 400 to show the motion of the indicator 400 and output the voice.

The control unit 340 of the wireless controller 500 generates a turn-on signal for turning on the television 530 in accordance with the voice command, and transmits the generated turn-on signal to the television 530 through the communication unit 360. Or, when a plurality of the above-mentioned wireless controllers 500 is provided, any one of the plurality of wireless controllers 500 may play a role of a master device, and the remaining wireless controllers 500 may play a role of slave devices. In other words, the wireless controller 500 playing the role of the master device may generate the turn-on signal for turning on the television 530 and transmit the turn-on signal to the wireless controllers 500 playing the role of the slave devices, and the wireless controllers 500 playing the role of the slave devices may transmit the turn-on signal to the nearby television 530. That is, the wireless controller 500 can perform communication with not only the external devices 510, 520, 530, and 540, but also with other wireless controllers 500, and the wireless controllers 500 playing the role of the slave devices may use the IR communication method to transmit the signal received from the wireless controller 500 playing the role of the master device to the external devices 510, 520, 530, and 540. The plurality of wireless controllers 500 may play both of the master device's role and the slave device's role. Or the wireless controllers 500 playing the role of the slave devices may be a partial configuration of the wireless controller 500 playing the role of the master device, and may be provided to be detachable from the master device. Even when provided in a detachable shape, the wireless controllers 500 may be provided to include all components of the above-mentioned wireless controller 500. Or the wireless controllers 500 may be provided to include at least the communication unit 360 and the control unit 340.

Meanwhile, the television 530 is turned on in accordance with the turn-on signal transmitted from the wireless controller 500, and when the television 530 is turned on, the control unit 340 of the wireless controller 500 outputs a voice saying "The TV is turned on" through the speaker 350. The user is able to recognize that the user's command has been performed through the voice output from the speaker 350 of the wireless controller 500.

In addition, the control unit 340 of the wireless controller 500 controls the indicator 400 such that the indicator 400 of the wireless controller 500 can show the predetermined motion, thereby enabling the user to recognize that the user's voice command has been performed. For example, the first indicator 410 may show one motion among the above-mentioned first motion M1 to the fourth motion M4 or a combination of one or more of the motions, thereby enabling the user to intuitively recognize that the wireless controller 500 has performed the user's voice command. Besides the first indicator 410, the second indicator 440 may also show one motion among the second motion M2, the third motion M3, and the fifth motion M5 respectively illustrated in FIGS. 8 to 10, or a combination of one or more of the motions. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the speaker 350 and the indicator 400 to only show the motion of the indicator 400 or only output a voice, or control both of the speaker 350 and the indicator 400 to show the motion of the indicator 400 and output the voice.

In the case in FIG. 11, although the user is inputting a command through a voice, the user may input the same command by manipulating the indicator 400 through a predetermined method or input the same command by combining the voice command and the manipulation of the indicator 400, as mentioned above. Expressions such as "Yes, okay" or "The TV is turned on" which are output through the speaker 350 are merely examples of the output expressions, and various types of expressions capable of conveying similar meanings may be prestored in the wireless controller 500, and the various types of prestored expressions which exhibit the similar meanings may be randomly output. In addition, the speaker 350 of the wireless controller 500 may output not only the above-mentioned voices but also various types of prestored signal sounds.

Figure 12:
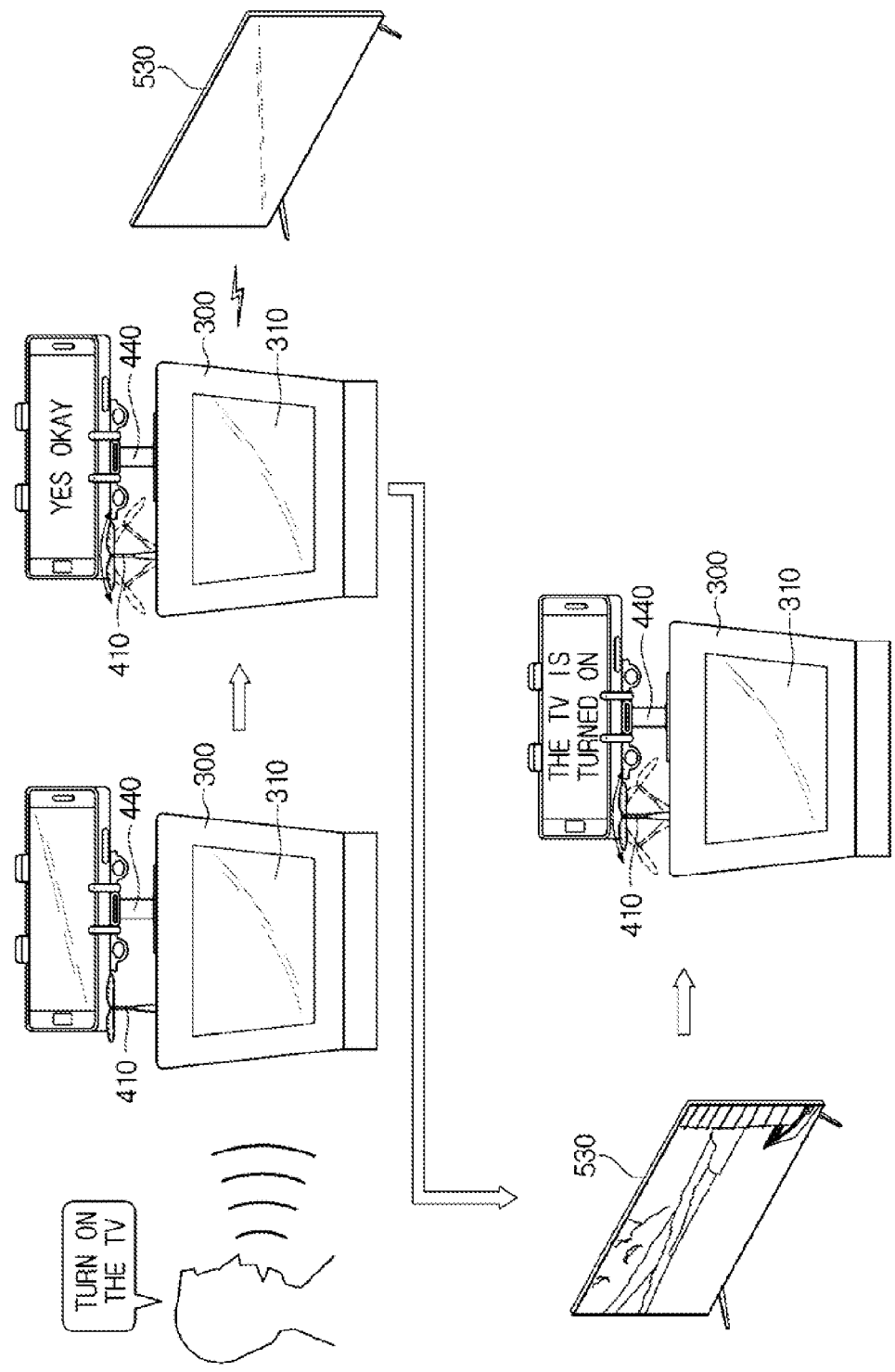
Figure 13:
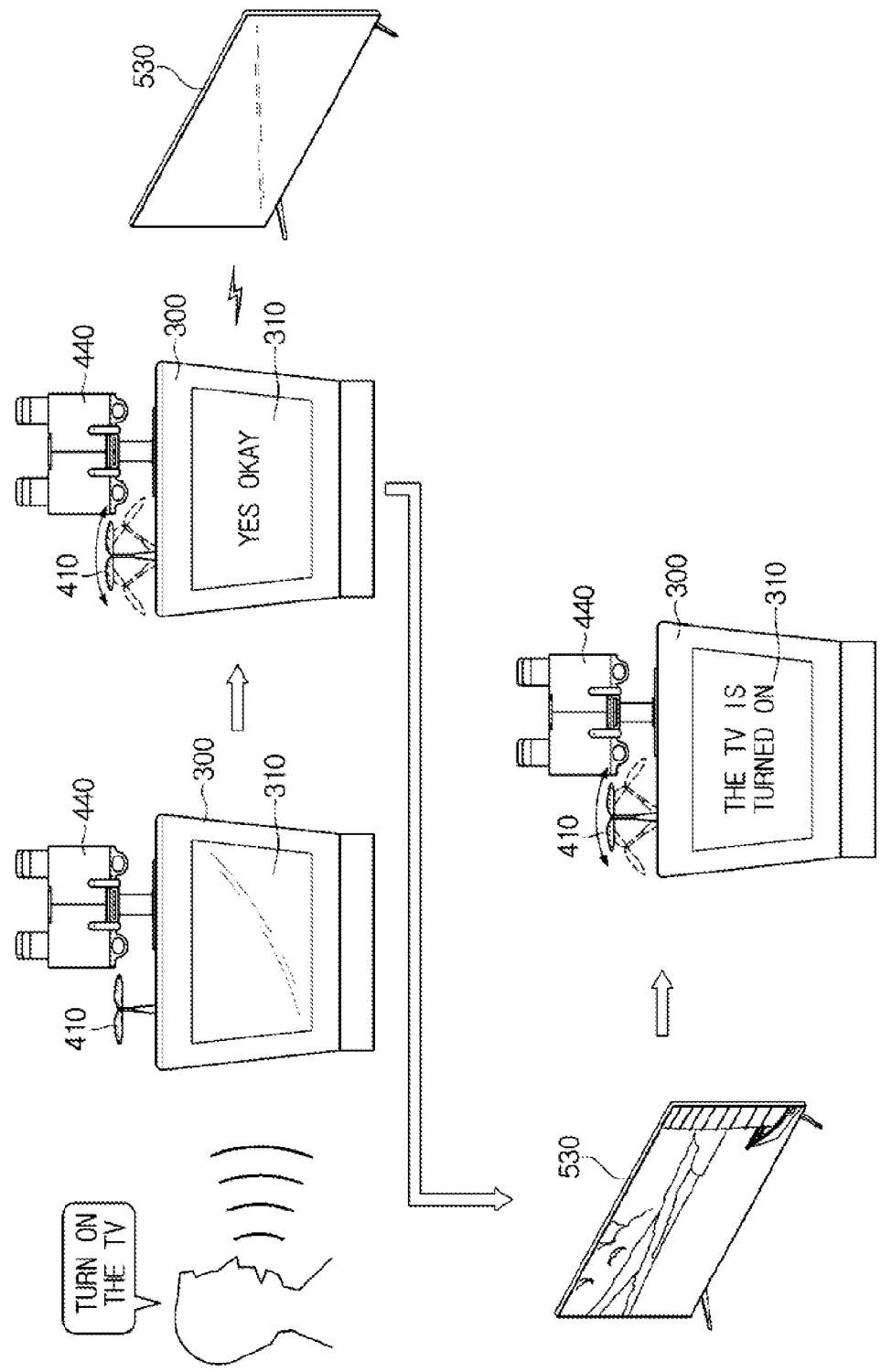

As mentioned above, an example in which the wireless controller 500 outputs a response to the user's command or a result of performing the command through the indicator 400 and the speaker 350 is illustrated in FIG. 11. In FIG. 12 and FIG. 13, examples in which the wireless controller 500 outputs the response to the user's command or the result of performing the command through the display unit and the indicator 400 are illustrated.

Referring to FIG. 12, when the user says "Turn on the TV" to turn on the television 530, the voice recognition unit 320 of the wireless controller 500 according to a disclosed embodiment recognizes the user's voice saying "Turn on the TV." To enable the user to recognize that the wireless controller 500 is responding to the user's voice command recognized in the voice recognition unit 320, the control unit 340 of the wireless controller 500 displays a text "Yes, okay" or the text together with an image through the display device mounted on the support unit of the second indicator 440 of the wireless controller 500. The control unit 340 of the wireless controller 500 may transmit a control signal for displaying a text or an image to the display device mounted on the support unit, or recognize the user's voice through the display device, e.g., a smartphone, mounted on the support unit and display the text or the image corresponding to the user's voice. In this case, an application which recognizes the user's voice command and displays the text or the image corresponding to the voice command may be installed in the display device such as the smartphone. The display device may output not only the text or the image but also the voice together as illustrated in FIG. 11.

Also, the control unit 340 of the wireless controller 500 controls the indicator 400 such that the indicator 400 of the wireless controller 500 can show a predetermined motion, thereby enabling the user to recognize that the wireless controller 500 is responding to the user's voice command. For example, the first indicator 410 may show the above-mentioned first motion M1 or the fourth motion M4, thereby enabling the user to intuitively recognize that the wireless controller 500 has recognized the user's voice command. Besides the first indicator 410, the second indicator 440 may also show the fifth motion M5 illustrated in FIG. 10. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the display device and the indicator 400 to only show the motion of the indicator 400 or only display the text or the image through the display device, or control both of the display device and the indicator 400 to show the motion of the indicator 400 and display the text or the image.

The control unit 340 of the wireless controller 500 generates a turn-on signal for turning on the television 530 in accordance with the voice command, and transmits the generated turn-on signal to the television 530 through the communication unit 360. The television 530 is turned on in accordance with the turn-on signal transmitted from the wireless controller 500, and when the television 530 is turned on, the control unit 340 of the wireless controller 500 displays a text "The TV is turned on" or the text together with an image through the display device. The control unit 340 of the wireless controller 500 may transmit a control signal for displaying the text or the image to the display device mounted on the support unit, or the display device, e.g., a smartphone, mounted on the support unit may display the text or the image corresponding to the television 530 being turned on. In this case, as mentioned above, an application which recognizes the user's voice command, detects operations of the external devices 510, 520, 530, and 540, and displays the text or the image corresponding to the operations may be installed in the display device such as the smartphone. The display device may output not only the text or the image but also the voice together as illustrated in FIG. 11. The user may recognize that the user's command has been performed by checking the text or the image displayed through the display device mounted on the support unit.

Also, the control unit 340 of the wireless controller 500 controls the indicator 400 such that the indicator 400 of the wireless controller 500 can show the predetermined motion, thereby enabling the user to recognize that the user's voice command has been performed. For example, the first indicator 410 may show one motion among the above-mentioned first motion M1 to the fourth motion M4 or a combination of one or more of the motions, thereby enabling the user to intuitively recognize that the wireless controller 500 has performed the user's voice command. Besides the first indicator 410, the second indicator 440 may also show one motion among the second motion M2, the third motion M3, and the fifth motion M5 respectively illustrated in FIGS. 8 to 10, or a combination of one or more of the motions. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the display device and the indicator 400 to only show the motion of the indicator 400 or only display the text or the image through the display device, or control both of the display device and the indicator 400 to show the motion of the indicator 400 and display the text or the image.

In the case in FIG. 12, although the user is inputting a command through a voice, the user may input the same command by manipulating the indicator 400 through a predetermined method or input the same command by combining the voice command and the manipulation of the indicator 400, as mentioned above. Texts such as "Yes, okay" or "The TV is turned on," which are displayed on the display device, are merely examples of the displayed expressions, and various types of expressions capable of conveying similar meanings may be prestored in the wireless controller 500 or the display device, and the various types of prestored expressions which exhibit the similar meanings may be randomly displayed. In addition, various types of images that may be displayed together with the text may also be prestored in the wireless controller 500 or the display device and randomly displayed together with the text.

Referring to FIG. 12, when the user says "Turn on the TV" to turn on the television 530, the voice recognition unit 320 of the wireless controller 500 according to a disclosed embodiment recognizes the user's voice saying "Turn on the TV." To enable the user to recognize that the wireless controller 500 is responding to the user's voice command recognized in the voice recognition unit 320, the control unit 340 of the wireless controller 500 displays the text "Yes, okay" or the text together with an image through the display device mounted on the support unit of the second indicator 440 of the wireless controller 500. The control unit 340 of the wireless controller 500 may transmit a control signal for displaying the text or the image to the display device mounted on the support unit, or recognize the user's voice through the display device, e.g., a smartphone, mounted on the support unit and display the text or the image corresponding to the user's voice. In this case, an application which recognizes the user's voice command and displays the text or the image corresponding to the voice command may be installed in the display device such as the smartphone. The display device may output not only the text or the image but also the voice together as illustrated in FIG. 11.

Also, the control unit 340 of the wireless controller 500 controls the indicator 400 such that the indicator 400 of the wireless controller 500 can show a predetermined motion, thereby enabling the user to recognize that the wireless controller 500 is responding to the user's voice command. For example, the first indicator 410 may show the above-mentioned first motion M1 or the fourth motion M4, thereby enabling the user to intuitively recognize that the wireless controller 500 has recognized the user's voice command. Besides the first indicator 410, the second indicator 440 may also show the fifth motion M5 illustrated in FIG. 10. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the display device and the indicator 400 to only show the motion of the indicator 400 or only display the text or the image on the display device, or control both of the display device and the indicator 400 to show the motion of the indicator 400 and display the text or the image.

The control unit 340 of the wireless controller 500 generates a turn-on signal for turning on the television 530 in accordance with the voice command, and transmits the generated turn-on signal to the television 530 through the communication unit 360. The television 530 is turned on in accordance with the turn-on signal transmitted from the wireless controller 500, and when the television 530 is turned on, the control unit 340 of the wireless controller 500 displays the text "The TV is turned on" or the text together with an image through the display device. The control unit 340 of the wireless controller 500 may transmit a control signal for displaying the text or the image to the display device mounted on the support unit, or the display device, e.g., a smartphone, mounted on the support unit may display the text or the image corresponding to the television 530 being turned on. In this case, as mentioned above, an application which recognizes the user's voice command, detects operations of the external devices 510, 520, 530, and 540, and displays the text or the image corresponding to the operations may be installed in the display device such as the smartphone. The display device may output not only the text or the image but also the voice together as illustrated in FIG. 11. The user may recognize that the user's command has been performed by checking the text or the image displayed through the display device mounted on the support unit.

Referring to FIG. 13, when the user says "Turn on the TV" to turn on the television 530, the voice recognition unit 320 of the wireless controller 500 according to a disclosed embodiment recognizes the user's voice saying "Turn on the TV." To enable the user to recognize that the wireless controller 500 is responding to the user's voice command recognized in the voice recognition unit 320, the control unit 340 of the wireless controller 500 displays the text "Yes, okay" or the text together with an image through the main body display unit 310 of the wireless controller 500. The control unit 340 of the wireless controller 500 controls the main body display unit 310 such that the main body display unit 310 is able to display the text or the image.

Also, the control unit 340 of the wireless controller 500 controls the indicator 400 such that the indicator 400 of the wireless controller 500 can show a predetermined motion, thereby enabling the user to recognize that the wireless controller 500 is responding to the user's voice command. Since this is the same as the description of FIG. 12, it will be omitted. In addition, the control unit 340 of the wireless controller 500 may control only one of the main body display unit 310 and the indicator 400 to only show the motion of the indicator 400 or only display the text or the image on the main body display unit 310, or control both of the main body display unit 310 and the indicator 400 to show the motion of the indicator 400 and display the text or the image.

The control unit 340 of the wireless controller 500 generates a turn-on signal for turning on the television 530 in accordance with the voice command, and transmits the generated turn-on signal to the television 530 through the communication unit 360. The television 530 is turned on in accordance with the turn-on signal transmitted from the wireless controller 500, and when the television 530 is turned on, the control unit 340 of the wireless controller 500 displays the text "The TV is turned on" or the text together with an image through the main body display unit 310. The control unit 340 of the wireless controller 500 controls the main body display unit 310 such that the main body display unit 310 is able to display the text or the image. The user may recognize that the user's command has been performed by checking the text or the image displayed on the main body display unit 310.

Also, the control unit 340 of the wireless controller 500 controls the indicator 400 such that the indicator 400 of the wireless controller 500 can show a predetermined motion, thereby enabling the user to recognize that the user's voice command has been performed. Since this is the same as the description of FIG. 12, it will be omitted. In addition, the control unit 340 of the wireless controller 500 may control only one of the main body display unit 310 and the indicator 400 to only show the motion of the indicator 400 or only display the text or the image on the main body display unit 310, or control both of the main body display unit 310 and the indicator 400 to show the motion of the indicator 400 and display the text or the image.

In the case in FIG. 13, although the user is inputting a command through a voice, the user may input the same command by manipulating the indicator 400 through a predetermined method or input the same command by combining the voice command and the manipulation of the indicator 400, as mentioned above. Texts such as "Yes, okay" or "The TV is turned on," which are displayed on the main body display unit 310, are merely examples of the displayed expressions, and various types of expressions capable of conveying similar meanings may be prestored in the wireless controller 500, and the various types of prestored expressions which exhibit the similar meanings may be randomly displayed. In addition, various types of images that may be displayed together with the text may also be prestored in the wireless controller 500 and randomly displayed together with the text.

Figure 14:
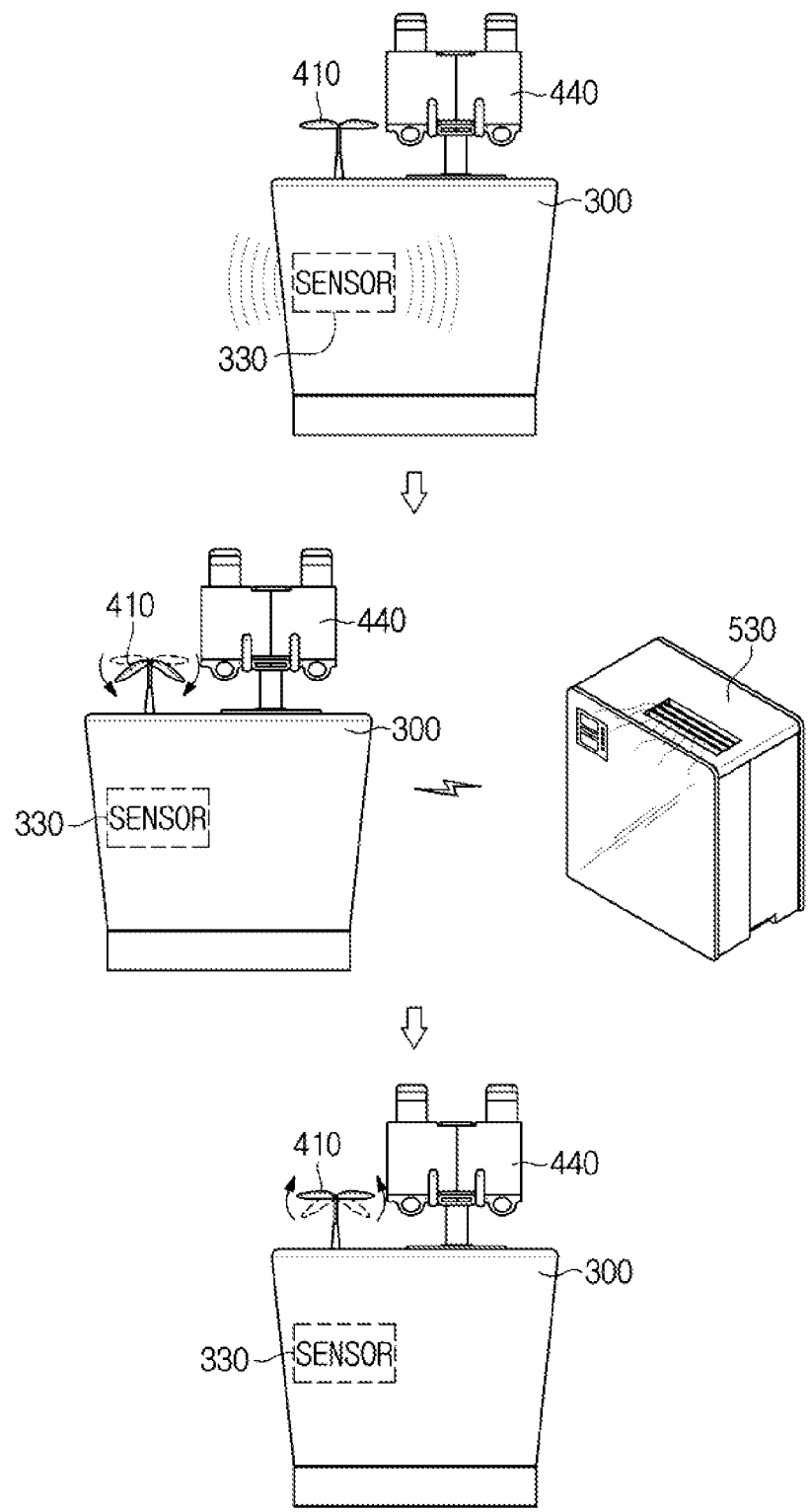

The wireless controller 500 according to a disclosed embodiment may control the external devices 510, 520, 530, and 540 in accordance with a user's command, or control the external devices 510, 520, 530, and 540 based on information detected in the sensor 330. FIG. 14 illustrates an example in which the wireless controller 500 according to a disclosed embodiment controls the external devices 510, 520, 530, and 540 in accordance with the information detected in the sensor 330.

Referring to FIG. 14, when the sensor 330 of the wireless controller 500 detects information around the wireless controller 500, the control unit 340 controls a motion of the indicator 400 corresponding to the detected information. For example, when the humidity sensor detects the humidity around the wireless controller 500 and the humidity is lower than a predetermined level, the control unit 340 of the wireless controller 500 controls the first indicator 410 such that the leaf portion of the first indicator 410 shows a motion of tilting downward, thereby showing that an indoor space is dry.

In addition, when the humidity detected in the humidity sensor is lower than the predetermined level, the control unit 340 of the wireless controller 500 generates a control signal which controls the humidifier 510 such that the humidity of the indoor space becomes equal to or higher than the predetermined humidity level. The control unit 340 transmits the generated control signal to the humidifier 510 through the communication unit 360, such that the humidifier 510 operates.

After the humidifier 510 operates, when the humidity detected in the humidity sensor of the wireless controller 500 becomes equal to or higher than the predetermined level, the control unit 340 of the wireless controller 500 controls the first indicator 410 such that the leaf portion of the first indicator 410 moves to a state that is similar to the state of the first indicator 410 prior to detecting that the humidity in the humidity sensor was lower than the predetermined level, e.g., before showing the motion of being tilted downward, thereby intuitively showing that the indoor space is maintaining an optimum humidity level.

Although the humidity sensor has been described as an example of the sensor 330, embodiments are not limited thereto, and the wireless controller 500 according to a disclosed embodiment may control the external devices 510, 520, 530, and 540 related to the information detected in the sensor 330 by controlling the air conditioner 520 based on information detected in the temperature sensor, or controlling the air purifier 540 based on information detected in the dust sensor or the gas sensor, etc.

Figure 15:
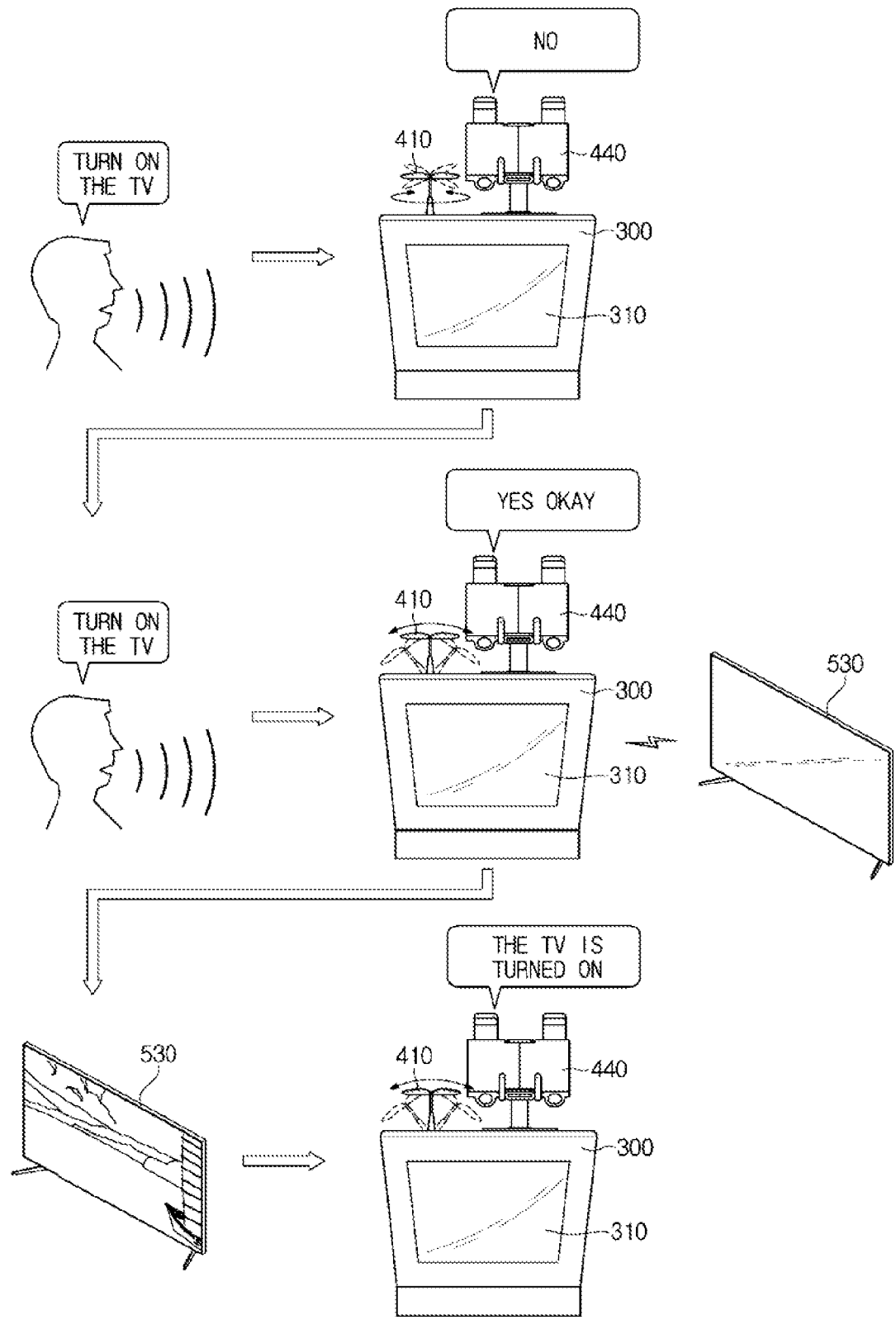
Figure 16:
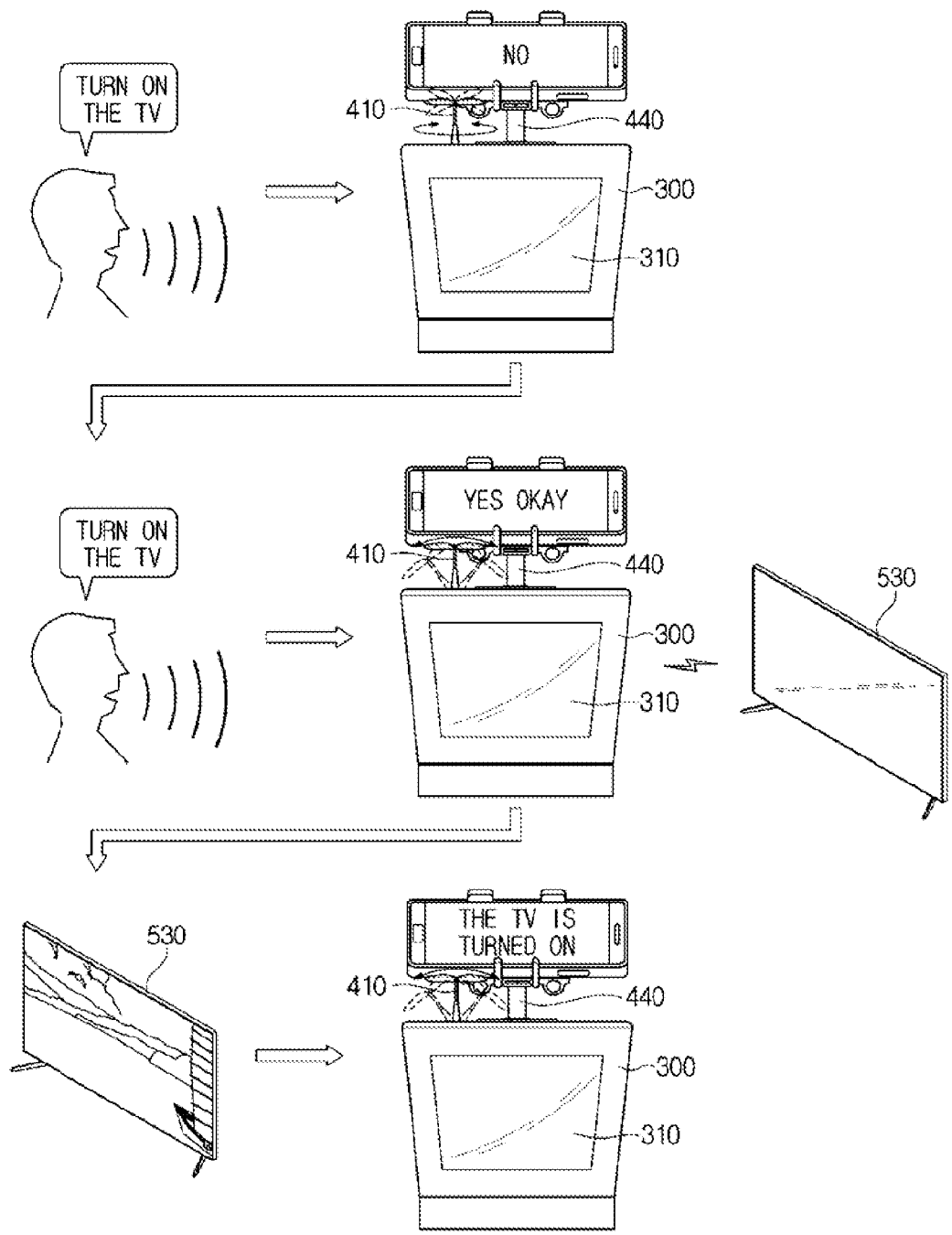
Figure 17:
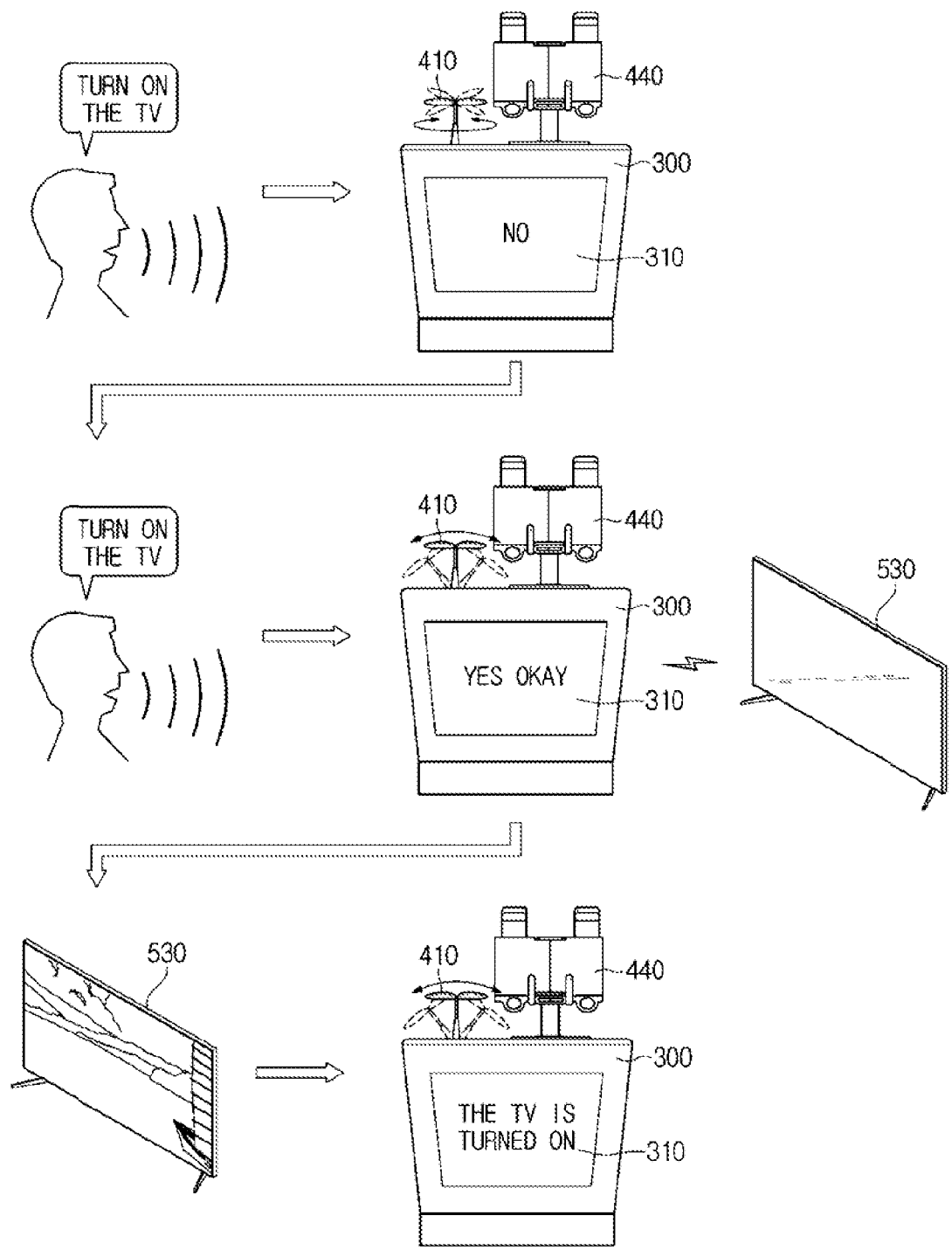

Corresponding to the user's command, the wireless controller 500 according to a disclosed embodiment may output the voice or display the text or the image complying with the user's command (for example, "Yes, okay") as mentioned above, or output a voice or display a text or an image not complying with the user's command (for example, "No") as illustrated in FIGS. 15 to 17. The wireless controller 500 according to a disclosed embodiment may output the voice, the image, or the text that does not comply with the user's command, thereby joking with the user and arousing a user's interest or fun in using the wireless controller 500, and enabling the user to feel greater familiarity with the wireless controller 500.

Referring to FIGS. 15 to 17, when the user says "Turn on the TV" to turn on the television 530, the voice recognition unit 320 of the wireless controller 500 according to a disclosed embodiment recognizes the user's voice saying "Turn on the TV." To enable the user to recognize that the wireless controller 500 is not complying with the user's voice command recognized in the voice recognition unit 320, the control unit 340 of the wireless controller 500 outputs a voice saying "No" though the speaker 350 of the wireless controller 500 as illustrated in FIG. 15, or displays a text "No" or the text with an image through the display device mounted on the support unit of the second indicator 440 or the main body display unit 310 of the wireless controller 500 as illustrated in FIG. 16 and FIG. 17. Also, the control unit 340 of the wireless controller 500 controls the indicator 400 such that the indicator 400 of the wireless controller 500 is able to show a motion corresponding to noncompliance with the user's command, thereby enabling the user to recognize that the wireless controller 500 is not complying with the user's voice command. For example, the first indicator 410 may show the second motion M2 similar to shaking one's head among the above-mentioned first motion M1 to the fourth motion M4, thereby enabling the user to intuitively recognize that the wireless controller 500 is not complying with the user's voice command. Besides the first indicator 410, the second indicator 440 may also show the second motion M2 illustrated in FIG. 10. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the display device, the main body display unit 310, the speaker 350, and the indicator 400 to perform only one of showing the motion of the indicator 400, displaying on the display device or the main body display unit 310, and outputting the voice through the speaker 350, or control all of the display device, the main body display unit 310, the speaker 350, and the indicator 400 to perform all of the showing the motion of the indicator 400, the displaying on the display device or the main body display unit 310, and the outputting the voice through the speaker 350. The control unit 340 of the wireless controller 500 may control the display device, the main body display unit 310, the speaker 350, and the indicator 400 such that a response not complying with the user's command is shown at a random time not determined in advance, such as responding "no" when the user asks to "turn on the TV". The unexpected noncompliance of the wireless controller 500 may arouse the user's interest or fun in using the wireless controller 500 and enable the user to feel greater familiarity with the wireless controller 500.

As illustrated in FIGS. 15 to 17, when the user checks or counters the noncompliance of the above-mentioned wireless controller 500 and says "Turn on the TV" a second time in order to turn on the television 530, the wireless controller 500 according to a disclosed embodiment may then realize a response complying with the user's command through at least one of the display device, the main body display unit 310, the speaker 350, and the indictor 400. Since the description of a case in which the wireless controller 500 complies with the user's command is the same as the description of FIGS. 11 to 13, it will be omitted.

Figure 18:
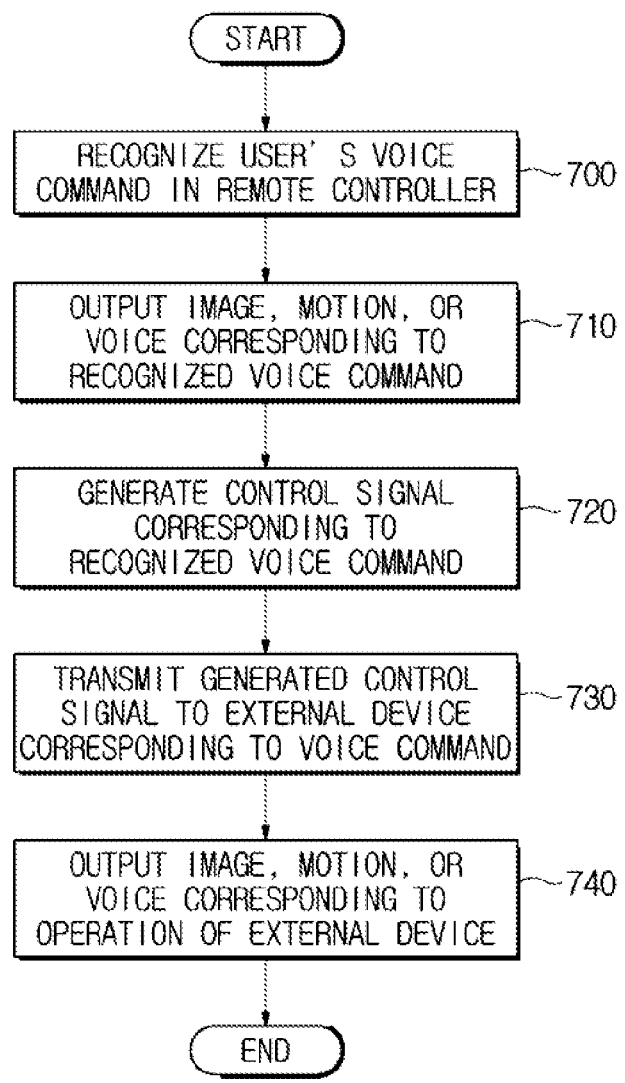
FIG. 18 is a flow chart illustrating a control method of the wireless controller according to a disclosed embodiment.

FIG. 18 is a flow chart illustrating a control method of the wireless controller 500 according to a disclosed embodiment.

As illustrated in FIG. 18, when the wireless controller 500 recognizes a user's voice command (S700), the wireless controller 500 outputs an image, a motion, or a voice corresponding to the recognized voice command (S710).

When the user says "Turn on the TV" to turn on the television 530, the voice recognition unit 320 of the wireless controller 500 according to a disclosed embodiment recognizes the user's voice saying "Turn on the TV." To enable the user to recognize that the wireless controller 500 is responding to the user's voice command recognized in the voice recognition unit 320, the control unit 340 of the wireless controller 500 outputs the voice saying "Yes, okay" through the speaker 350 of the wireless controller 500. Also, the control unit 340 of the wireless controller 500 controls the indicator 400 such that the indicator 400 of the wireless controller 500 can show a predetermined motion, thereby enabling the user to recognize that the wireless controller 500 is responding to the user's voice command. For example, the first indicator 410 may show the above-mentioned first motion M1 or the fourth motion M4, thereby enabling the user to intuitively recognize that the wireless controller 500 has recognized the user's voice command. Besides the first indicator 410, the second indicator 440 may also show the fifth motion M5 illustrated in FIG. 10. Or the control unit 340 of the wireless controller 500 displays the text "Yes, okay" or the text together with an image through the display device mounted on the support unit of the second indicator 440 or the main body display unit 310 of the wireless controller 500. The control unit 340 of the wireless controller 500 may control the main body display unit 310 such that the main body display unit 310 can display the text or the image, and transmit a control signal for displaying the text or the image to the display device mounted on the support unit. Or the control unit 340 of the wireless controller 500 may recognize the user's voice through the display device, e.g., a smartphone, mounted on the support unit and display the text or the image corresponding to the user's voice. In this case, an application which recognizes the user's voice command and displays the text or the image corresponding to the voice command may be installed in the display device such as the smartphone.

In addition, the wireless controller 500 generates a control signal corresponding to the recognized voice command (S720), and transmits the generated control signal to the external devices 510, 520, 530, and 540 corresponding to the voice command (S730). When the external devices 510, 520, 530, and 540 operate, the wireless controller 500 outputs the image, the motion, or the voice corresponding to the operations of the external devices 510, 520, 530, and 540 (S740).

The control unit 340 of the wireless controller 500 generates a turn-on signal for turning on the television 530 in accordance with the voice command, and transmits the generated turn-on signal to the television 530 through the communication unit 360. When the television 530 is turned on, the control unit 340 of the wireless controller 500 outputs a voice saying "The TV is turned on" through the speaker 350. Or the control unit 340 of the wireless controller 500 displays a text "The TV is turned on" or the text together with an image through the main body display unit 310 or the display device mounted on the support unit. By the voice output through the speaker 350 of the wireless controller 500 or checking the text or the image displayed on the main body display unit 310, the user is able to recognize that the user command has been performed.

Also, the control unit 340 of the wireless controller 500 controls the indicator 400 such that the indicator 400 of the wireless controller 500 can show the predetermined motion, thereby enabling the user to recognize that the user's voice command has been performed. For example, the first indicator 410 may show one motion among the above-mentioned first motion M1 to the fourth motion M4 or a combination of one or more of the motions, thereby enabling the user to intuitively recognize that the wireless controller 500 has performed the user's voice command. Besides the first indicator 410, the second indicator 440 may also show one motion among the second motion M2, the third motion M3, and the fifth motion M5 respectively illustrated in FIGS. 8 to 10, or a combination of one or more of the motions. The control unit 340 of the wireless controller 500 may control only one of the first indicator 410 and second the indicator 440 to show the motion or control both of the first indicator 410 and second the indicator 440 to show the motion. In addition, the control unit 340 of the wireless controller 500 may control only one of the indicator 400, the speaker 350, the main body display unit 310, and the display device to only show the motion of the indicator 400, only output a voice, or only display an image or a text. Or the control unit 340 of the wireless controller 500 may control one or more of the speaker 350, the indicator 400, the main body display unit 310, and the display device to enable one or more of the showing the motion of the indicator 400, the outputting the voice, and the displaying the image or the text on the main body display unit 310 or the display device to be performed together.

Meanwhile, indicators according to embodiments different from the above-mentioned indicator will be described with reference to FIGS. 19 to 34. Unlike the above-mentioned indicator described with reference to FIGS. 1 to 18, the embodiments below collectively designate shapes of a flower, a stem, and a flowerpot as an indicator.

An indicator according to a first embodiment of the present disclosure will be described with reference to the drawings.

As illustrated in FIGS. 19 to 22, an indicator 1 according to the first embodiment of the present disclosure includes a flowerpot 10, a pair of stems 11 and 12 vertically movably installed at the flowerpot 10, a pair of flowers 13 and 14 blooming by interlocking with the vertical movement of the pair of stems 11 and 12, a driving device 15 generating a power, and a lifting device 16 receiving the power from the driving device 15 to lift the stems 11 and 12, wherein the driving device 15 and the lifting device 16 are accommodated in the flowerpot 10.

Figure 19:
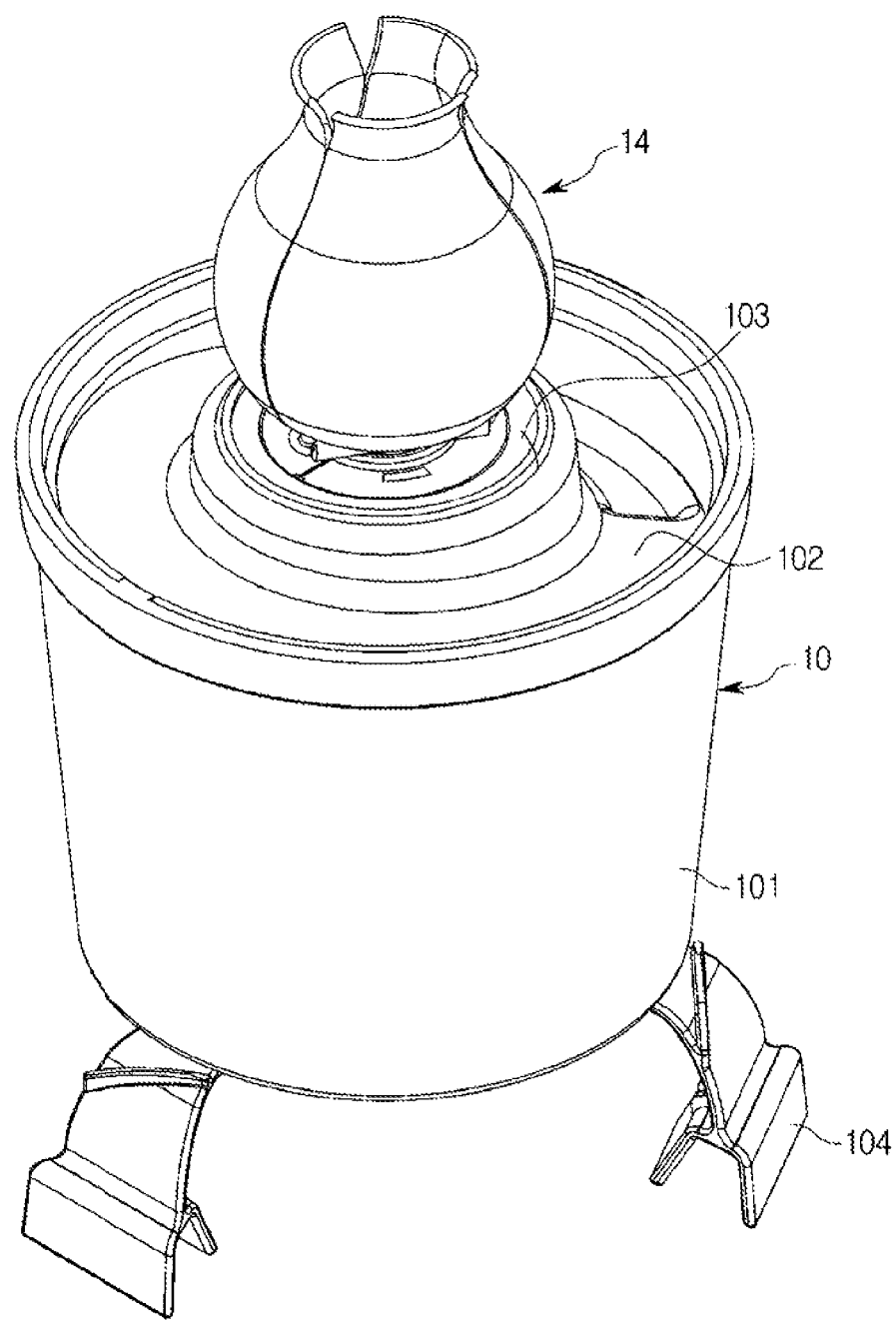
FIG. 19 is a perspective view of an indicator according to a first embodiment of the present disclosure.
Figure 20:
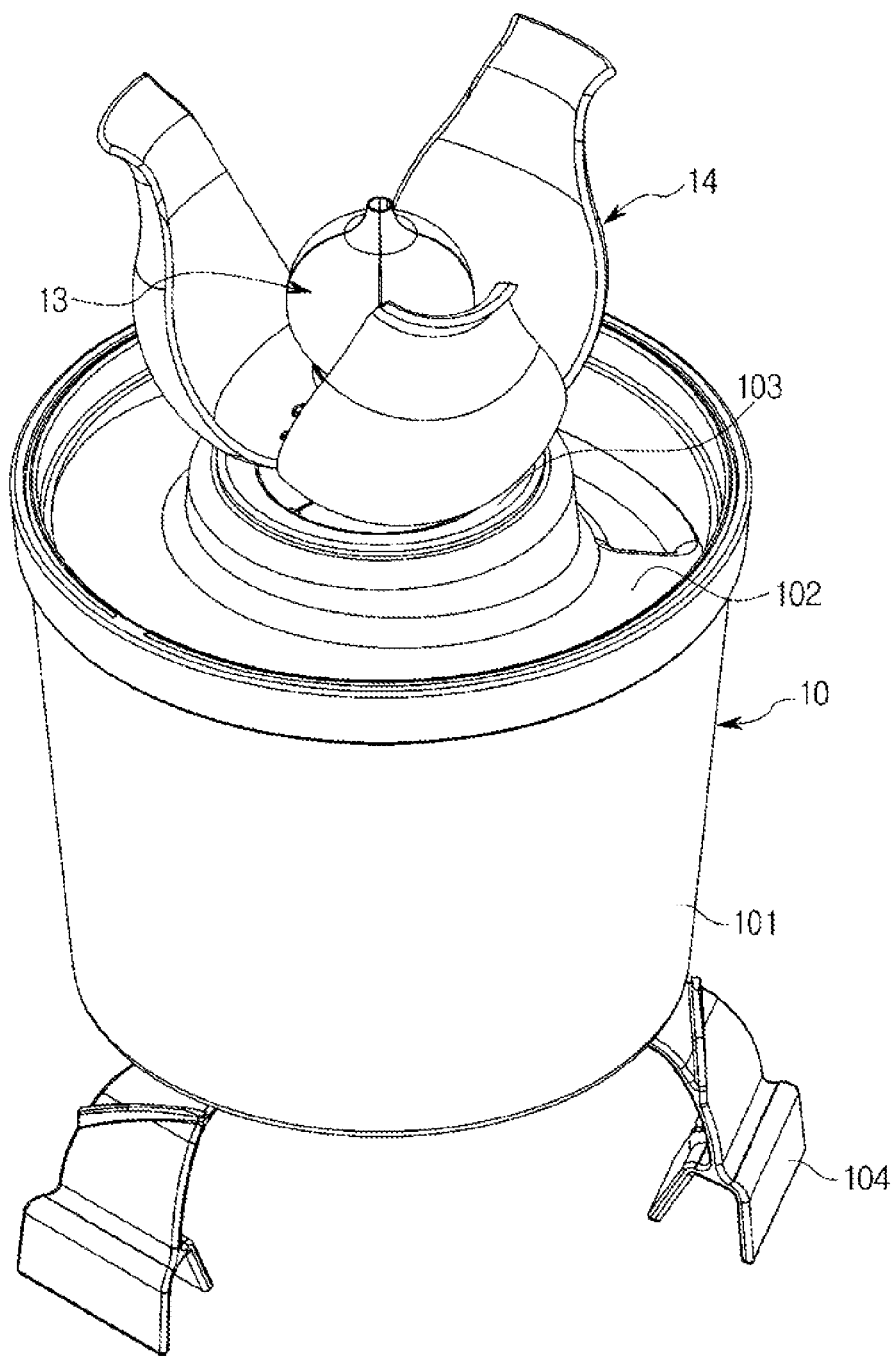
FIG. 20 is a perspective view illustrating a state in which only a first flower is bloomed in the indicator according to the first embodiment of the present disclosure.
Figure 21:
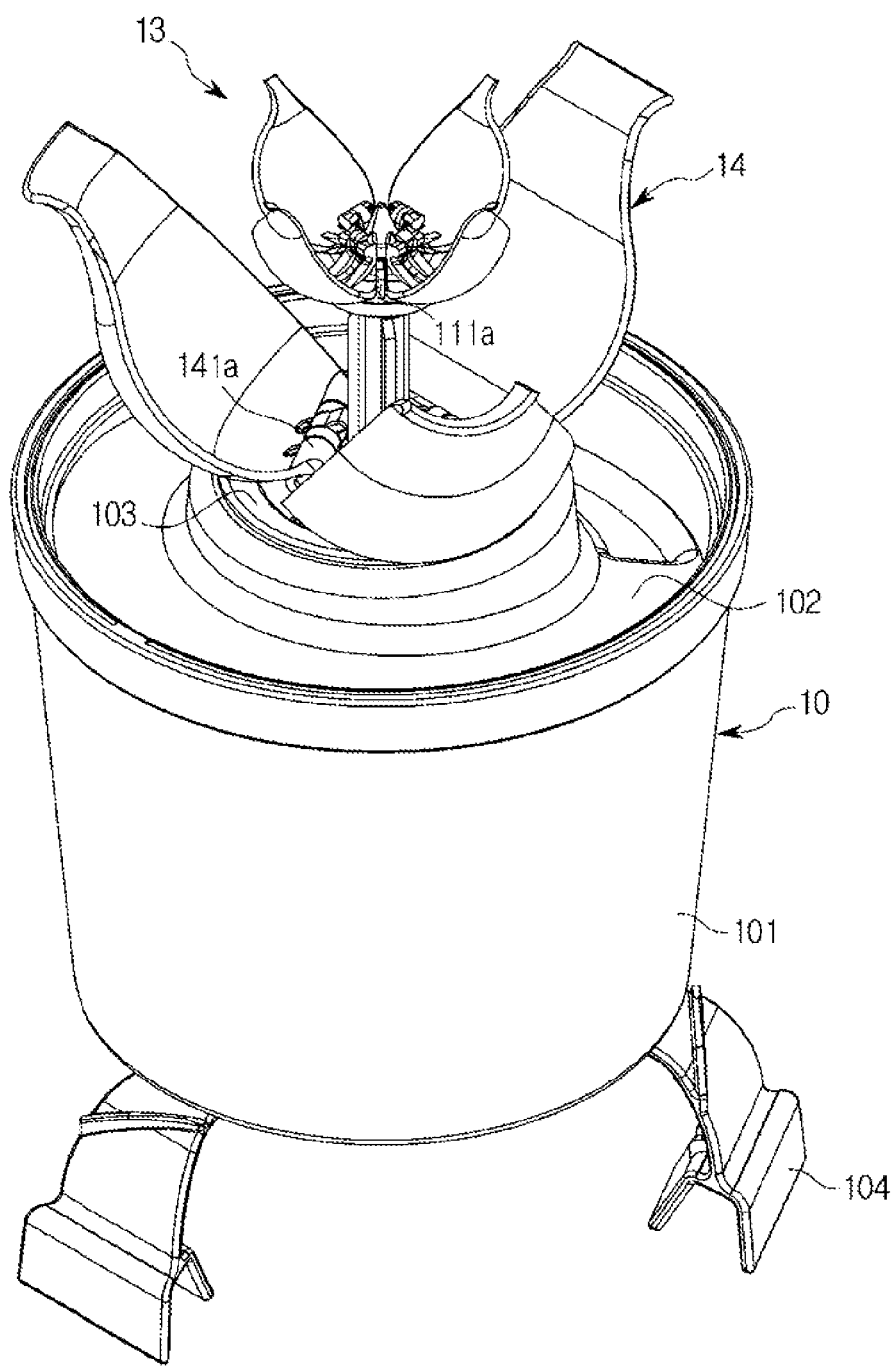
FIG. 21 is a perspective view illustrating a state in which the first flower and a second flower are both bloomed in the indicator according to the first embodiment of the present disclosure.
Figure 22:
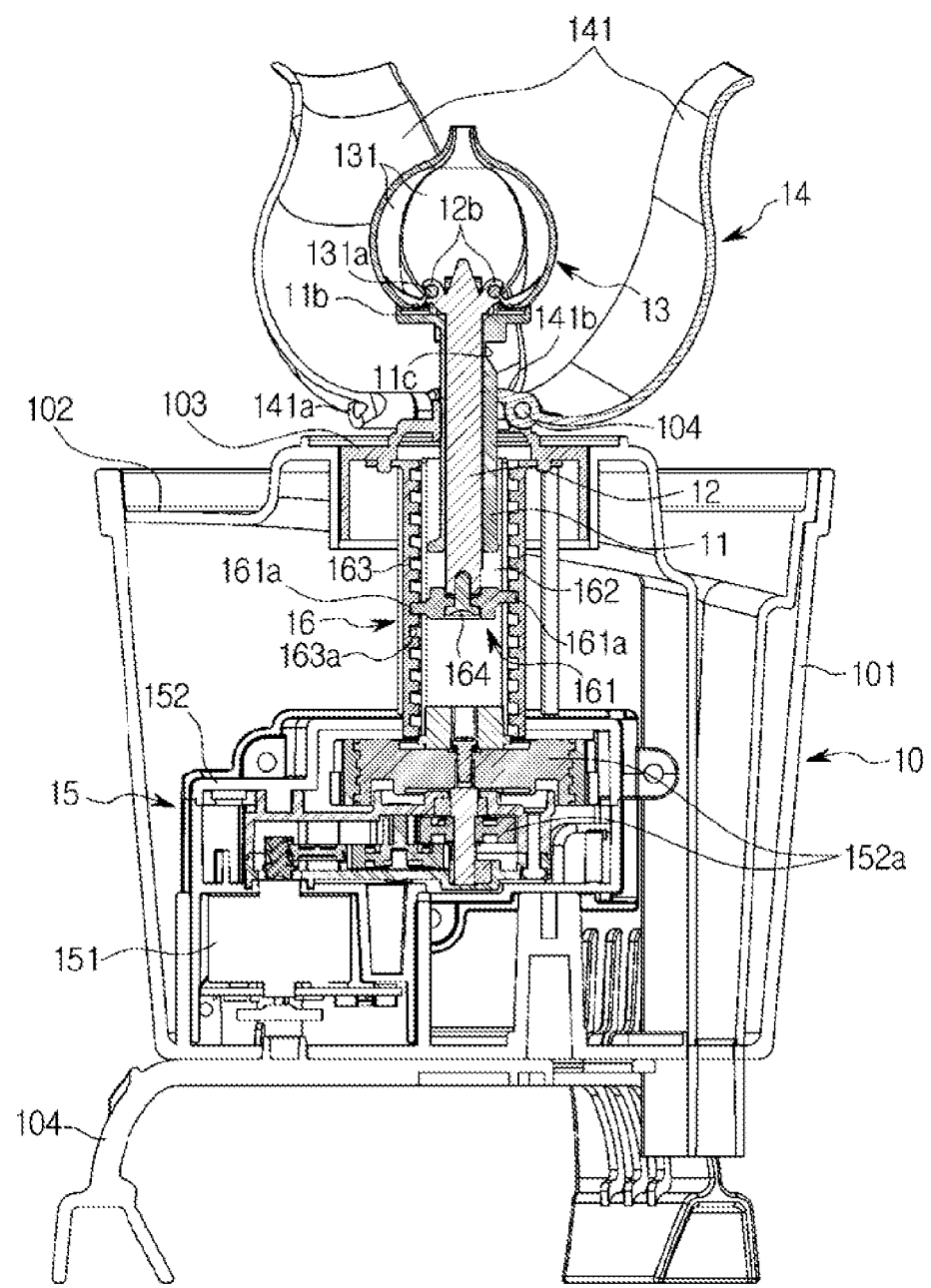
FIG. 22 is a cross-sectional view of the indicator according to the first embodiment of the present disclosure.
Figure 23:
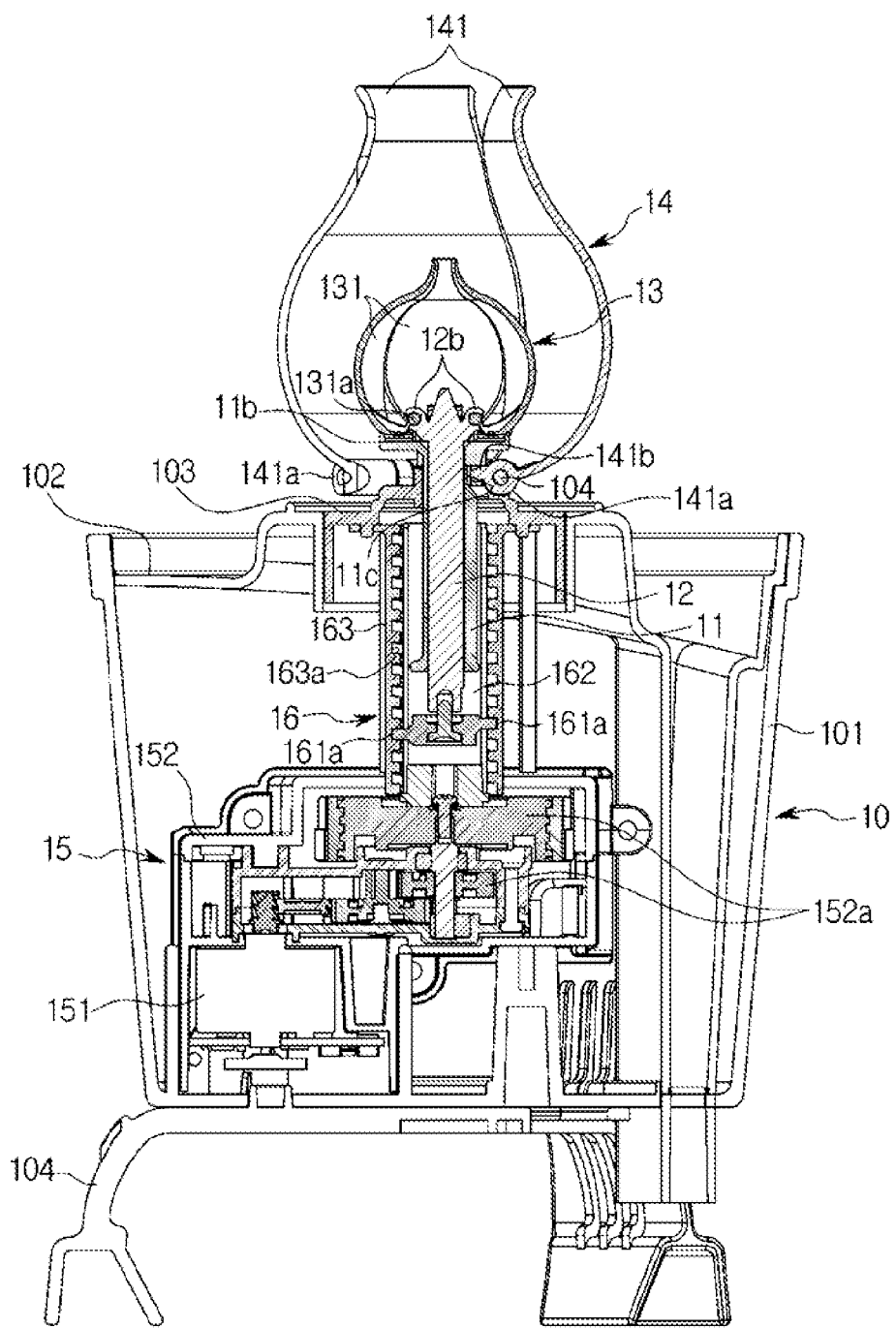
FIG. 23 is a cross-sectional view illustrating a state in which only the first flower is bloomed in the indicator according to the first embodiment of the present disclosure.
Figure 24:
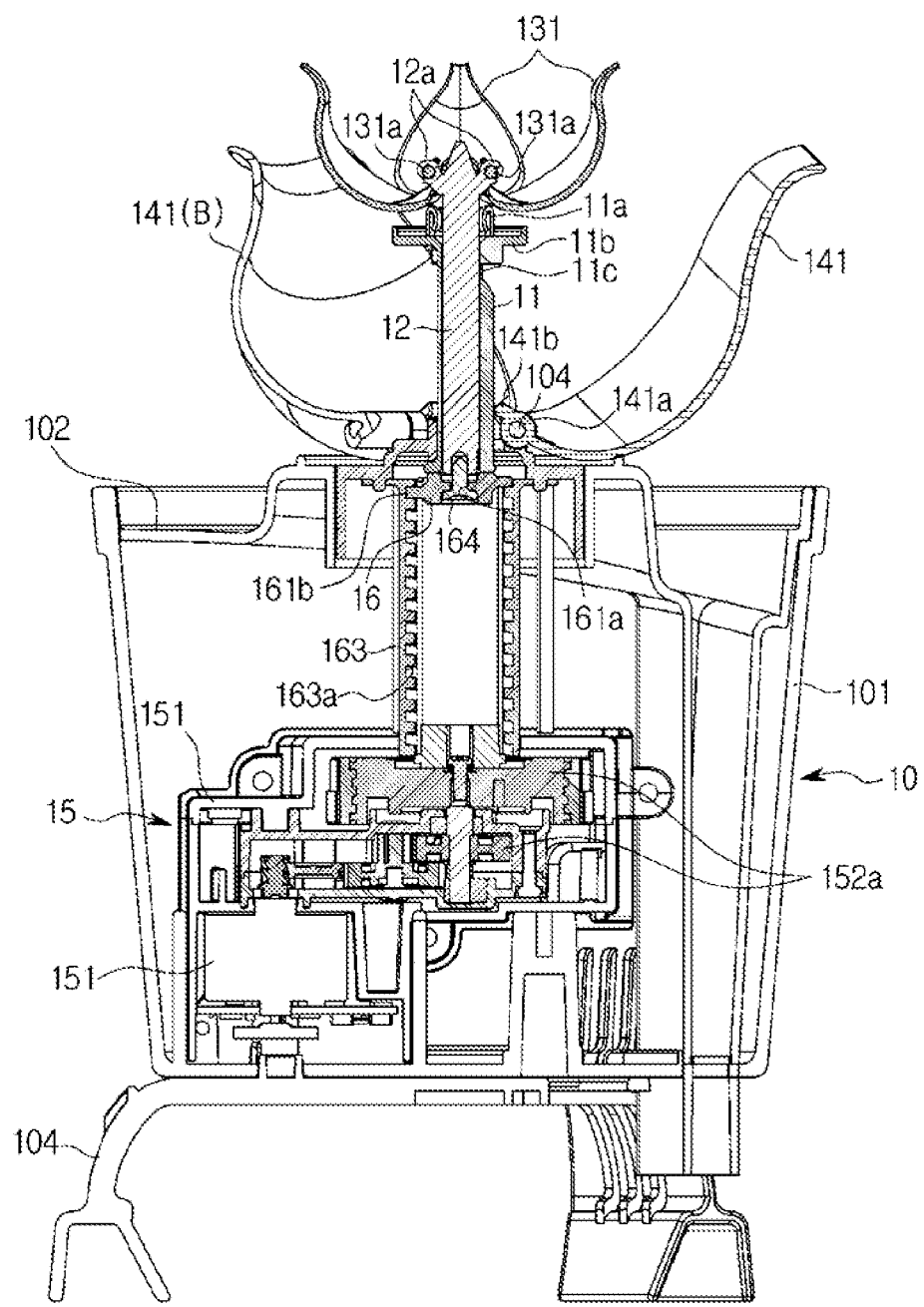
FIG. 24 is a cross-sectional view illustrating a state in which the first flower and the second flower are both bloomed in the indicator according to the first embodiment of the present disclosure.

The first flower 13 and the second flower 14 both remain closed as illustrated in FIG. 19 and FIG. 22 when the stems 11 and 12 have moved downward, and as the stems 11 and 12 rise, only the first flower 13 blooms as illustrated in FIG. 20 and FIG. 23, and then the first flower 13 and the second flower 14 both bloom as illustrated in FIG. 21 and FIG. 24.

Figure 25:
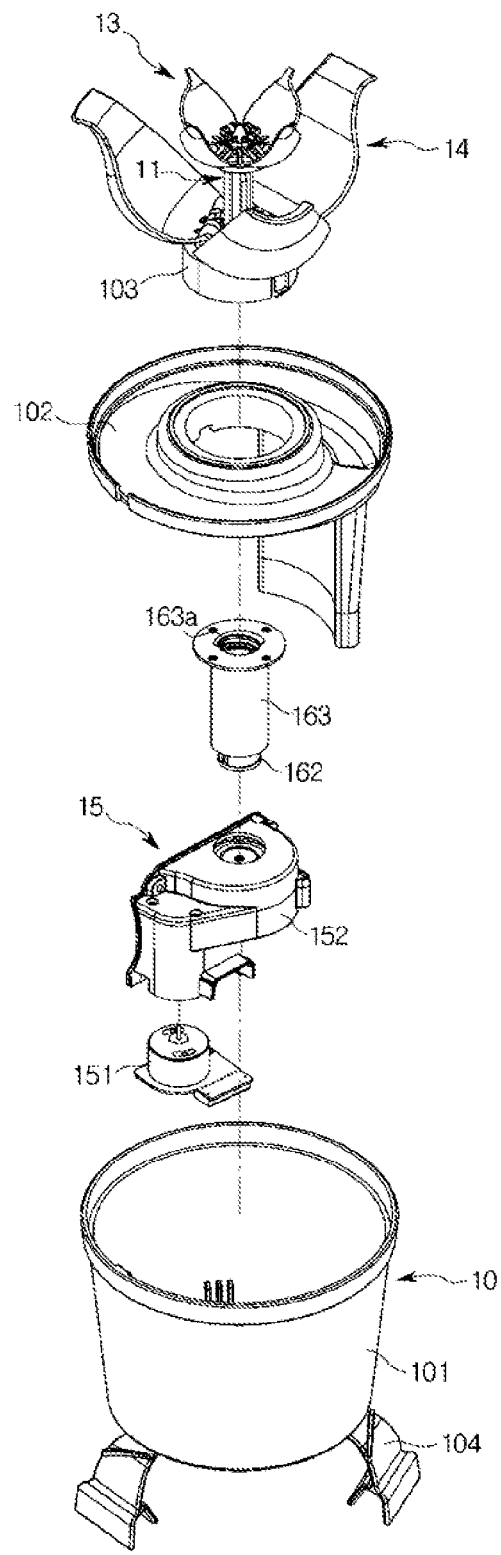
FIGS. 25 and 26 are exploded perspective views of the indicator according to the first embodiment of the present disclosure.
Figure 26:
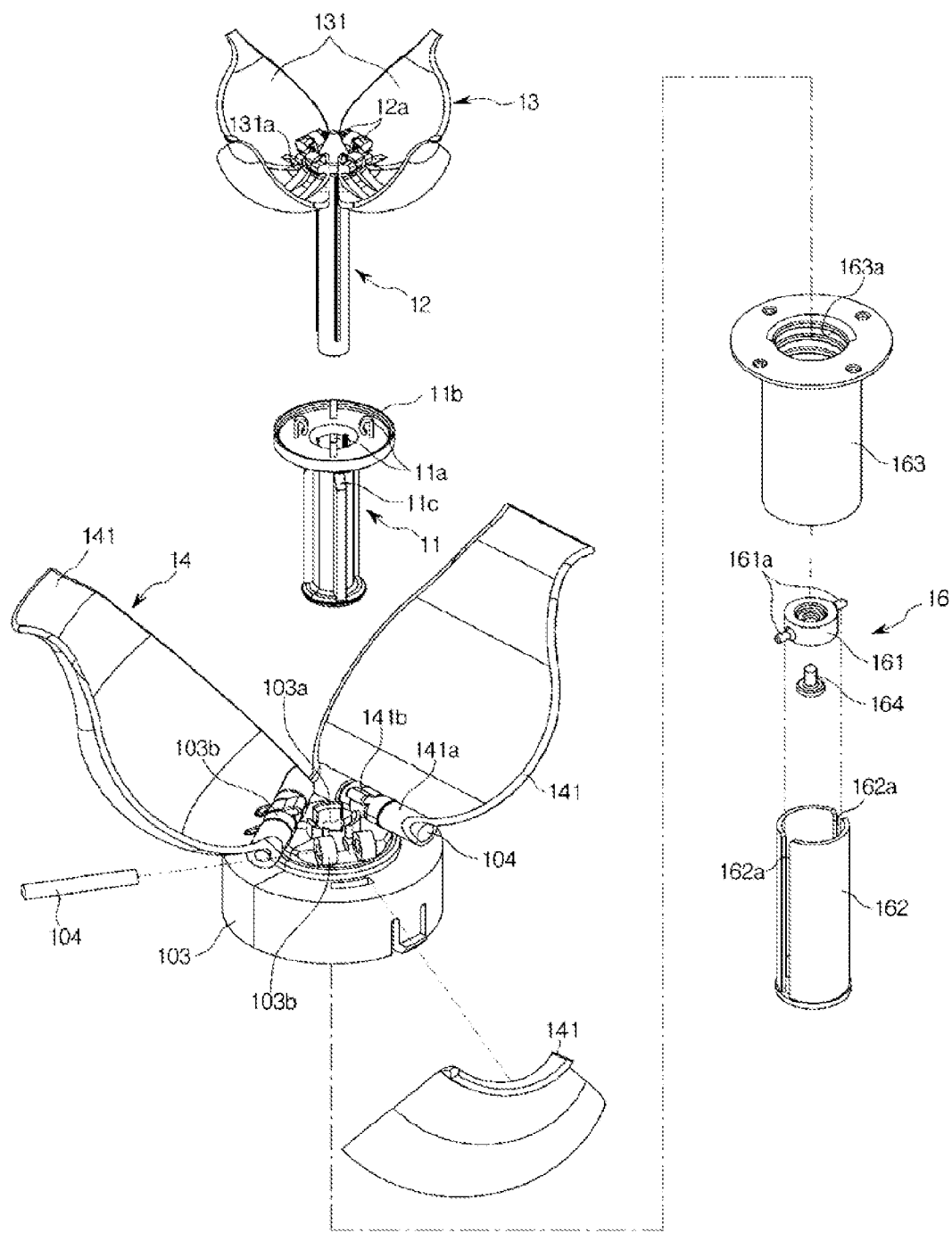

As illustrated in FIG. 25 and FIG. 26, the flowerpot 10 includes a flowerpot body 101 formed in a nearly cylindrical shape with an open upper portion to accommodate the above-mentioned driving device 15 and the lifting device 16, a flowerpot cover 102 closing the open top surface of the flowerpot body 101, and a guide member 103 installed at the center of the flowerpot cover 102 to guide the vertical movement of the stems 11 and 12.

At a bottom portion of the flowerpot body 101, a support stand 104 which enables the flowerpot body 101 to be stably supported on various types of horizontal surfaces is installed.

A guide hole 103a through which the stems 11 and 12 are movable is installed at the center of the guide member 103, a second lifting guide 163 to be described below is installed at a bottom portion thereof, and the first flower 13 to be described below is installed at a top portion thereof.

In the present embodiment, the pair of stems 11 and 12 include a first stem 11 formed in a hollow cylindrical shape, and a second stem 12 movably installed in the first stem 11.

The second stem 12 vertically moves by the lifting device 16, and the first stem 11 receives power through the second stem 12 and vertically moves together with the second stem 12.

The pair of flowers 13 and 14 include the first flower 13 and the second flower 14 accommodated in the first flower 13 while the first flower 13 is closed. In the present embodiment, the first flower 13 is installed at the guide member 103 of the flowerpot 10 to bloom or be closed by interlocking with the vertical movement of the first stem 11 and the second stem 12. The second flower 14 is installed at the top of the second stem 12 to bloom or be closed in accordance with relative positions of the first stem 11 and the second stem 12.

The second stem 12 vertically moves by receiving the power from the lifting device 16, and the first stem 11 receives the power through the second stem 12 and moves together with the second stem 12 only within a predetermined distance. That is, after the first stem 11 and the second stem 12 move a predetermined distance upward together, the first stem 11 stops moving, and only the second stem 12 additionally moves a predetermined distance upward. To enable the first stem 11 to move together with the second stem 12 as above, a plurality of elastically supported units 11a (refer to FIG. 24) which are elastically supported at an outer circumferential surface of the second stem 12 are included at an upper portion of the first stem 11.

The first flower 13 is formed by a plurality of first petals 131 disposed in a circumferential direction, and the second flower 14 is formed by a plurality of second petals 141 disposed in a circumferential direction. Here, the second flower 14 is formed to have a relatively smaller size than the first flower 13 to be accommodated in the first flower 13 while the first flower 13 is closed.

The first petals 131 are rotatably installed at the top portion of the above-mentioned guide member 103. For this, first hinge portions 103b at which the first petals 131 are rotatably installed are provided at the guide member 103, and second hinge portions 131a rotatably installed at the first hinge portions 103b are provided at the lower portion of the first petals 131. In the present embodiment, pins 104 are respectively installed to penetrate the first hinge portions 103b and the second hinge portions 131a to enable the first hinge portions 103b and the second hinge portions 131a to be rotatably coupled to each other.

To enable the first flower 13 to bloom or be closed by interlocking with the vertical movement of the stems 11 and 12, locking portions 131b are respectively provided at the first petals 131, and locking grooves 11c to which the locking portions 131b are locked are provided at an outer circumferential surface of the first stem 11. In the present embodiment, the locking portions 131b extend inward from the second hinge portions 131a. Consequently, when the first stem 11 has moved downward, the locking portions 131b are locked to the locking grooves 11c, and the first petals 131 remain closed. As the first stem 11 moves upward, the locking portions 141b are detached from the locking grooves 11c and are supported at the outer circumferential surface of the first stem 11, causing the first petals 131 to rotate outward and the first flower 13 to bloom.

The second petals 141 are rotatably installed at the top of the second stem 12. Third hinge portions 12a at which the second petals 141 are rotatably installed are provided at the top of the second stem 12, and fourth hinge portions 141a rotatably installed at the third hinge portions 12a are provided at the lower portion of the second petals 141.

To enable the second petals 141 to rotate with respect to the fourth hinge portions 141a, a support unit 11b is formed at the top of the first stem 11. The support unit 11b selectively supports the lower portion of the second petals 141 in accordance with the relative positions of the first stem 11 and the second stem 12 such that the second petals 141 remain closed. That is, outer surfaces of the second petals 131 are supported by the support unit 11b and the second petals 141 remain closed when the first stem 11 and the second stem 12 move together, and the outer surfaces of the second petals 141 are spaced apart from the support unit 11b when only the second stem 12 moves upward, causing the second petals 141 to rotate outward by the self-load.

The driving device 15 includes a driving motor 151 generating a rotary force, and a deceleration unit 152 formed by a plurality of gears 152a.

The lifting device 16 includes a lifting member 161 rotatably installed at the bottom of the second stem 12, a first lifting guide 162 in which the lifting member 161 is vertically movably installed and connected to the deceleration unit 152 to rotate by the deceleration unit 152, and the second lifting guide 163 formed in a hollow cylindrical shape and having the first lifting guide 162 accommodated therein.

The lifting member 161 is installed at the bottom of the second stem 12 through a screw 164. The screw 164 passes through a through-hole 161a provided at the center of the lifting member 161 and is coupled to the bottom of the second stem 12. Consequently, the first stem 11 does not rotate even if the lifting member 161 rotates. In addition, the lifting member 161 includes a pair of guide protrusions 161b protruding outward in a radial direction from both sides of the outer surface thereof and installed at a guide groove 163a to be described below.

The first lifting guide 162 is connected to the driving device 15 and receives the rotary force from the driving device 15 to rotate. The first lifting guide 162 is formed in the hollow cylindrical shape and the stems 11 and 12 and the lifting member 161 are vertically movably installed therein. A pair of guide slots 162a vertically extending and guiding the vertical movement of the pair of guide protrusions 161b are provided at both sides of the first lifting guide 162. Consequently, when the first lifting guide 162 rotates, the lifting member 161 receives force through the guide protrusions 161b and rotates together with the first lifting guide 162.

The second lifting guide 163 is formed in the hollow cylindrical shape, has the first lifting guide 162 provided therein, and a guide groove 163a in a spiral shape in which the pair of guide protrusions 161b are movably installed provided at an inner circumferential surface thereof. Consequently, when the lifting member 161 rotates by the first lifting guide 162, the guide protrusions 161b provided at the lifting member 161 are guided by the guide groove 163a, causing the lifting member 161 to move toward one side of an upper side and a lower side. Here, a moving direction of the lifting member 161 is determined by a rotary direction of the first lifting guide 162.

Hereinafter, operations of the indicator 1 configured as above will be described in detail with reference to the drawings.

First, as illustrated in FIG. 19 and FIG. 22, the second petals 141 and the first petals 131 all remain closed when the second stem 12 and the first stem 11 has moved downward.

When the first lifting guide 162 rotates in one direction by the driving device 15 at the above state, the lifting member 161 in the first lifting guide 162 rotates together with the first lifting guide 162. Since the guide protrusions 161b provided at the lifting member 161 move along the spiral guide groove 163a, the lifting member 161 moves upward, and accordingly, the second stem 12 moves upward. Since the first stem 11 is supported at the second stem 12 through the elastically supported units 11a, the first stem 11 moves upward together with the second stem 12.

As the second stem 12 and the first stem 11 move, the locking portions 131b which have been locked to the locking grooves 11c are detached from the locking grooves 11c, and accordingly, the first petals 131 rotate outward with respect to the pins 104. Consequently, as illustrated in FIG. 20 and FIG. 23, the first flower 13 blooms.

Then, the second stem 12 and the first stem 11 move upward, and the first stem 11 stops moving after the second stem 12 and the first stem 11 has moved a set distance. Even after the first stem 11 has stopped moving, the second stem 12 moves by the lifting member 161. As only the second stem 12 moves, the support unit 11b that has been supporting the lower portion of the first petals 131 is spaced apart from the second petals 141. Consequently, as illustrated in FIG. 21 and FIG. 24, the second petals 141 rotate outward with respect to the fourth hinge portions 141a by the self-load, causing the second flower 14 to bloom.

In other words, as described above, as the stems 11 and 12 move upward, the first flower 13 and the second flower 14 bloom in order.

In addition, when the first lifting guide 162 moves in the opposite direction by the driving device while the second flower 14 and the first flower 13 are unfolded as above, the stems 11 and 12 move downward, and accordingly, the second flower 14 and the first flower 13 are closed in order.

The indicator 1 may be operated by interlocking with various types of conditions such as an indoor temperature or a humidity level. That is, after setting an optimum condition value, the stems 11 and 12 may move upward as a condition becomes closer to the optimum condition value to enable the first flower 13 and the second flower 14 to bloom, and the stems 11 and 12 may move downward as the condition becomes farther from the optimum condition value to enable the first flower 13 and the second flower 14 to be closed.

For the above-mentioned condition values such as a temperature and a humidity level, the indicator 1 may include a sensor for measuring the condition values such as the temperature and the humidity level, or condition values measured by a separate device may be transmitted to the indicator 1.

In addition, the indicator 1 may be used alone as suggested in the above embodiment, or used by being included in various types of devices such as a humidifier or an air conditioner.

Hereinafter, an indicator according to a second embodiment of the present disclosure will be described in detail with reference to the drawings.

Figure 27:
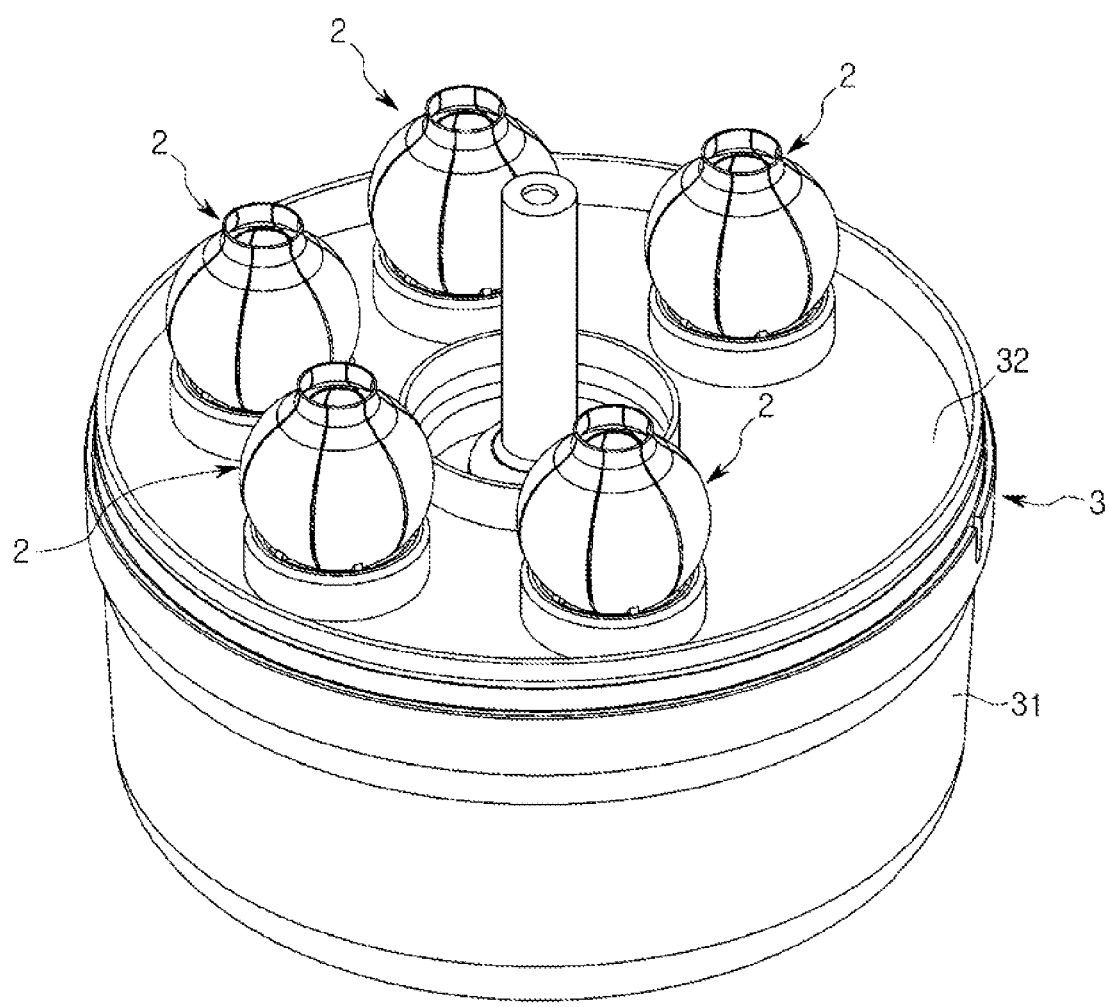
FIG. 27 is a perspective view of a water storage unit to which indicators according to a second embodiment of the present disclosure have been applied.
Figure 28:
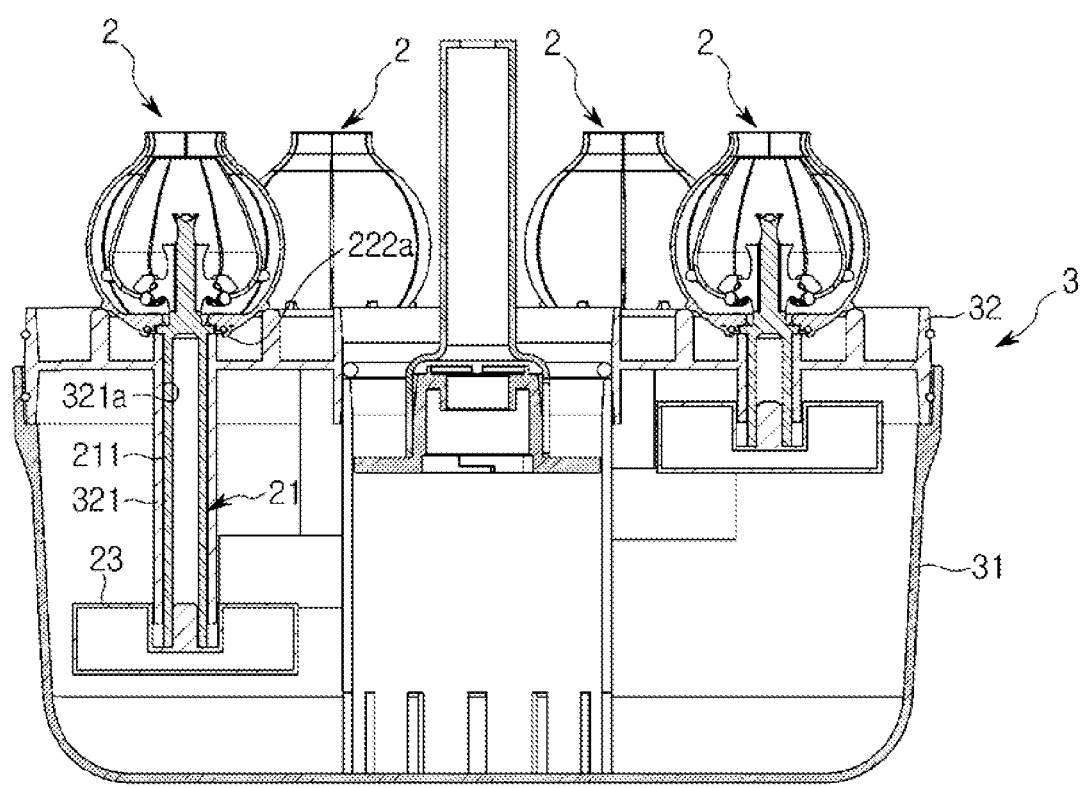
FIG. 28 is a cross-sectional view of the water storage unit to which the indicators according to the second embodiment of the present disclosure have been applied.

In the present embodiment, as illustrated in FIG. 27 and FIG. 28, an indicator 2 is applied to a water storage unit 3 used in a humidifier, and the like, and is able to display a water level of water filled in the water storage unit 3.

The water storage unit 3 includes a water bottle 31 of which a top surface is open to fill water therein, and a water bottle cover 32 covering the top surface of the water bottle 31.

Figure 29:
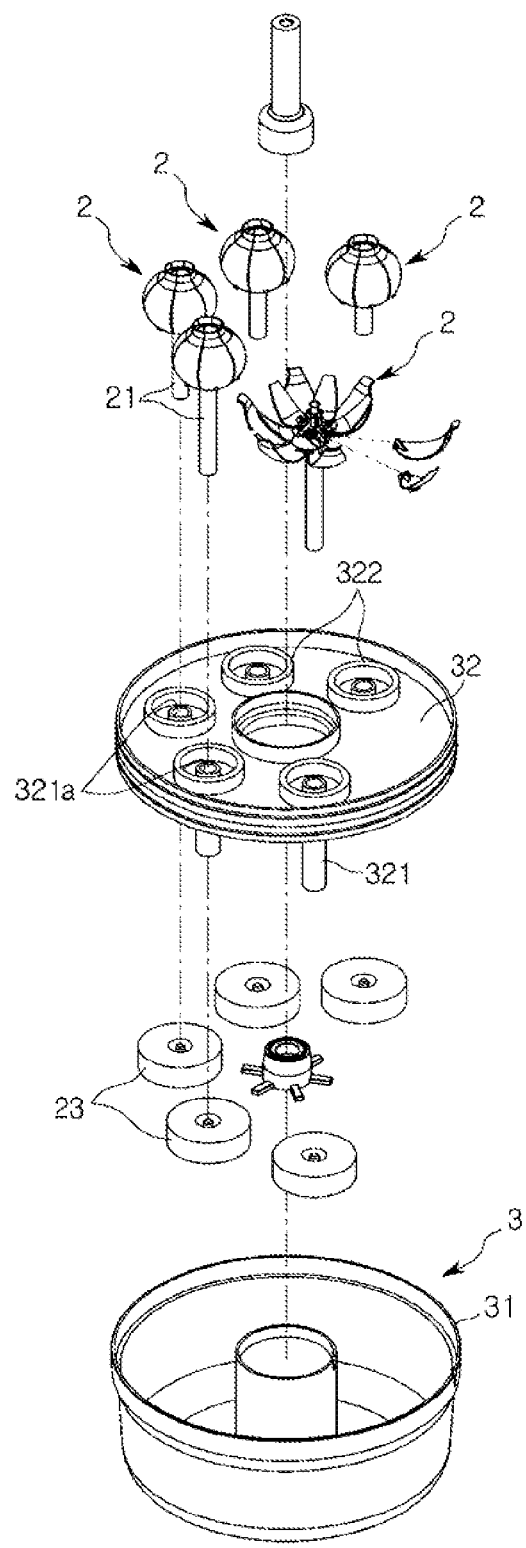
FIG. 29 is an exploded perspective view of the water storage unit to which the indicators according to the second embodiment of the present disclosure have been applied.

The indicator 2 includes a stem 21 vertically movably installed at the water bottle cover 32, a flower 22 installed at the top of the stem 21, and a buoyant body 23 installed at the bottom of the stem 21. In the present embodiment, as illustrated in FIG. 29, the five indicators 2 include five stems 21 disposed apart from each other in a circumferential direction, five flowers 22 respectively installed at tops of the five stems 21, and five buoyant bodies 23 respectively installed at bottoms of the stems 21.

The water bottle cover 32 includes five guide units 321 for guiding the vertical movement of the stems 21, and support units 322 supporting first petals 221 to be described below to enable the first petals 221 to be closed.

Figure 30:
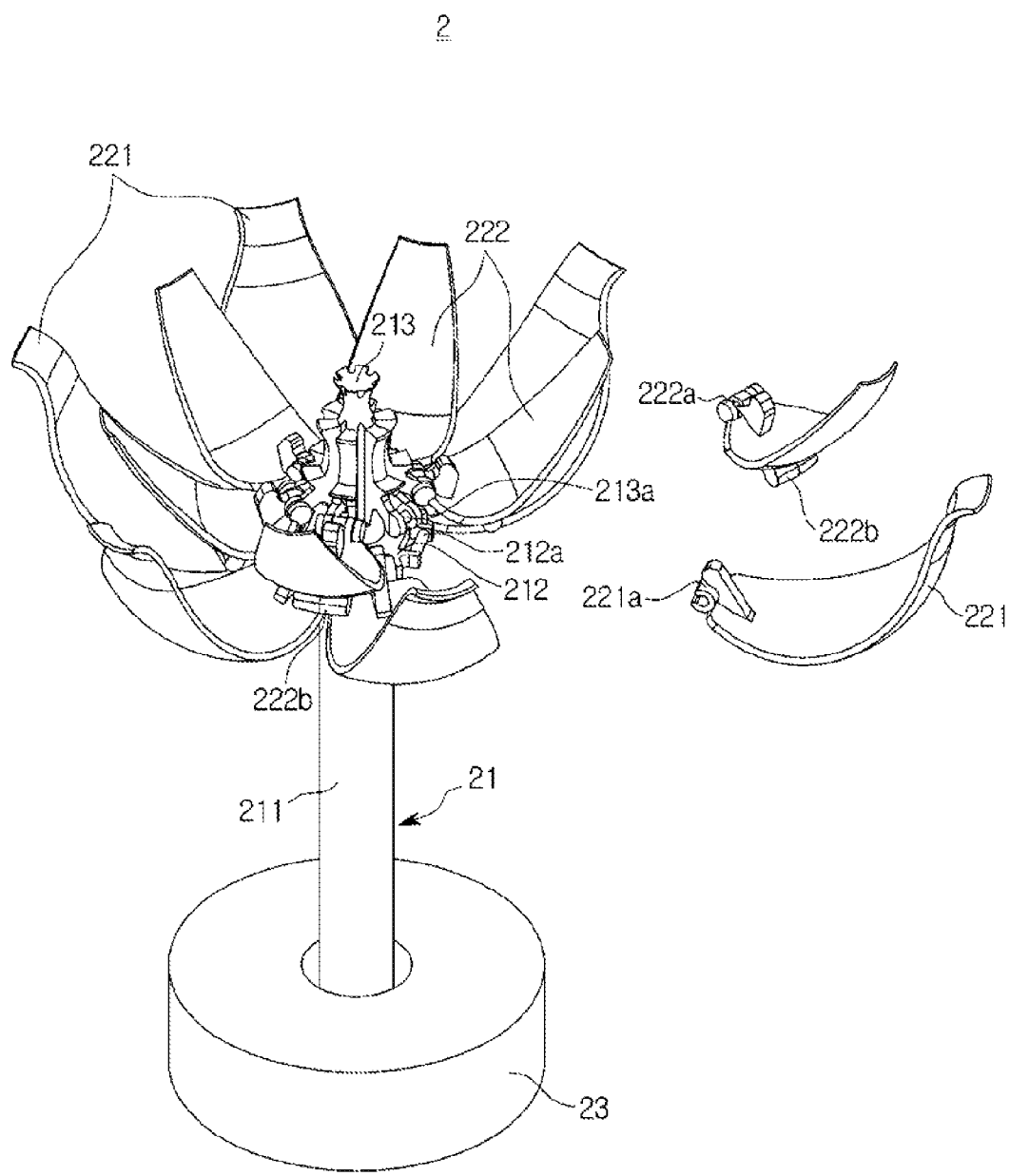
FIG. 30 is an exploded perspective view of the indicator according to the second embodiment of the present disclosure.
Figure 31:
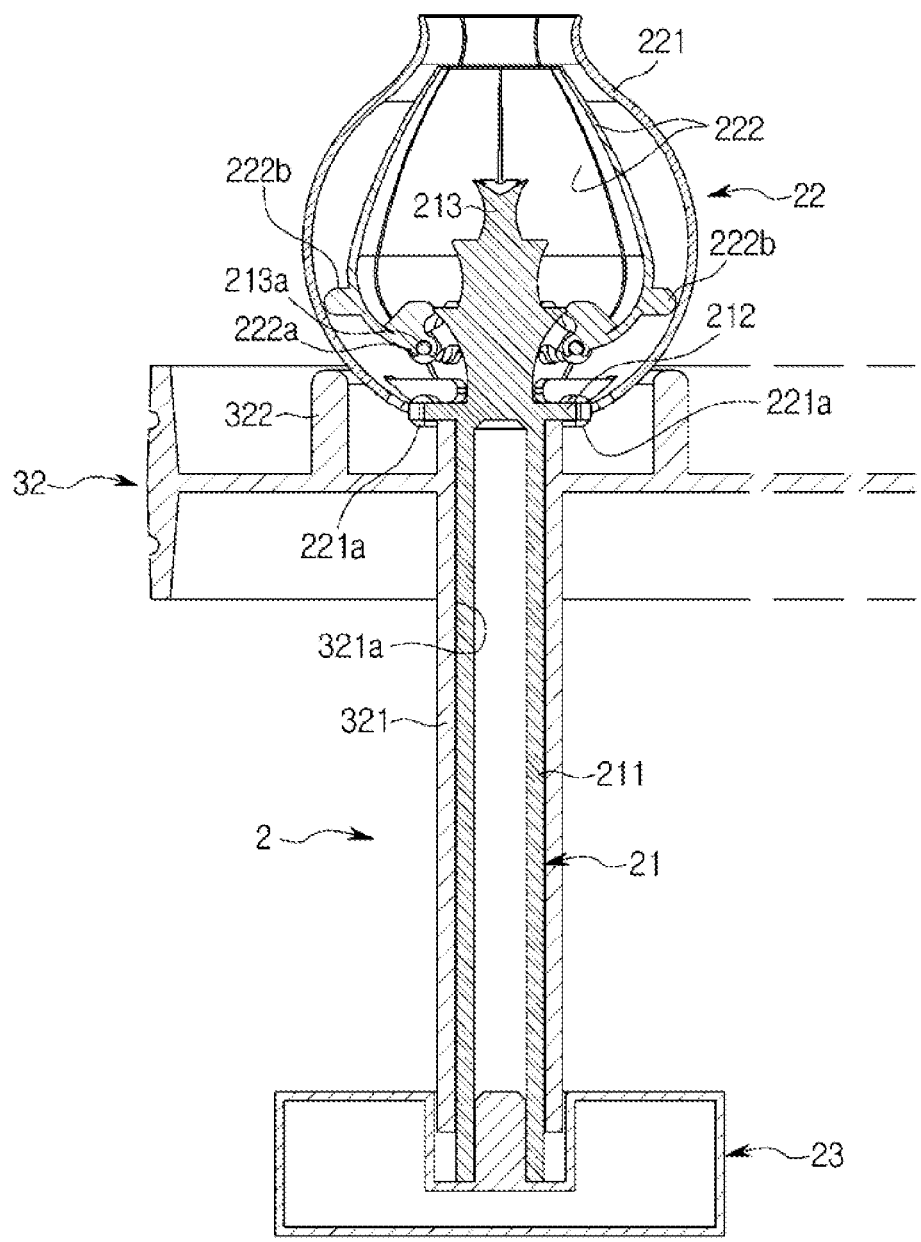
FIG. 31 is a cross-sectional view illustrating an installation state of the indicator according to the second embodiment of the present disclosure.

As illustrated in FIG. 30 and FIG. 31, the guide units 321 vertically extend and guide holes 321a in which the stems 21 are movably installed are provided at the guide units 321. In the present embodiment, lengths of the stems 21 and lengths of the guide units 321 are formed to be shorter in stages while progressing in the circumferential direction as illustrated in FIG. 29. This is to enable the five indicators 2 to rise in order one at a time in accordance with the water level, such that the flowers 22 of the indicators 2 bloom or are closed one at a time.

Again, referring to FIG. 30 and FIG. 31, the lengths of the guide units 321 are formed relatively shorter than those of the stems 21 to guide the vertical movement of the stems 21, and the lengths of the guide units 321 are formed to be shorter in stages while progressing in the circumferential direction. The length differences between the guide units 321 and the stems 21 installed at the guide units 321 are formed to be equal to the length differences between other guide units 321 and the stems 21. This is to enable the flowers 22 to bloom at equal heights.

The support units 322 extend upward from the top surface of the water bottle cover 32, and are formed in a ring shape with respect to the guide units 321, such that, as the stems 21 move downward, the support units 322 support outer surfaces of the first petals 221 to be described below to enable the first petals 221 to be closed.

The stems 21 include stem portions 211 movably installed at the guide holes 321a, step portions 212 extending from the tops of the stem portions 211 in the radial direction, and pistil portions 213 extending upward from the step portions 212.

The flowers 22 are formed by the plurality of first petals 221 disposed in the circumferential direction, and second petals 222 disposed in the circumferential direction and formed to have relatively smaller sizes than the first petals 221 to be accommodated in the first petals 221. The first petals 221 include second hinge portions 221a rotatably installed at first hinge portions 212a provided at the above-mentioned step portions 212, and the second petals 222 include fourth hinge portions 222a rotatably installed at third hinge portions 213a provided at the above-mentioned pistil portions 213. In addition, the second petals 222 include interlocking protrusions 222b formed on outer surfaces thereof and enabling the second petals 222 to rotate by interlocking with the rotations of the first petals 221.

The buoyant bodies 23 are formed in a shape of a sealed container in which air is filled to float on the water and are installed at the bottoms of the stems 21.

Figure 32:
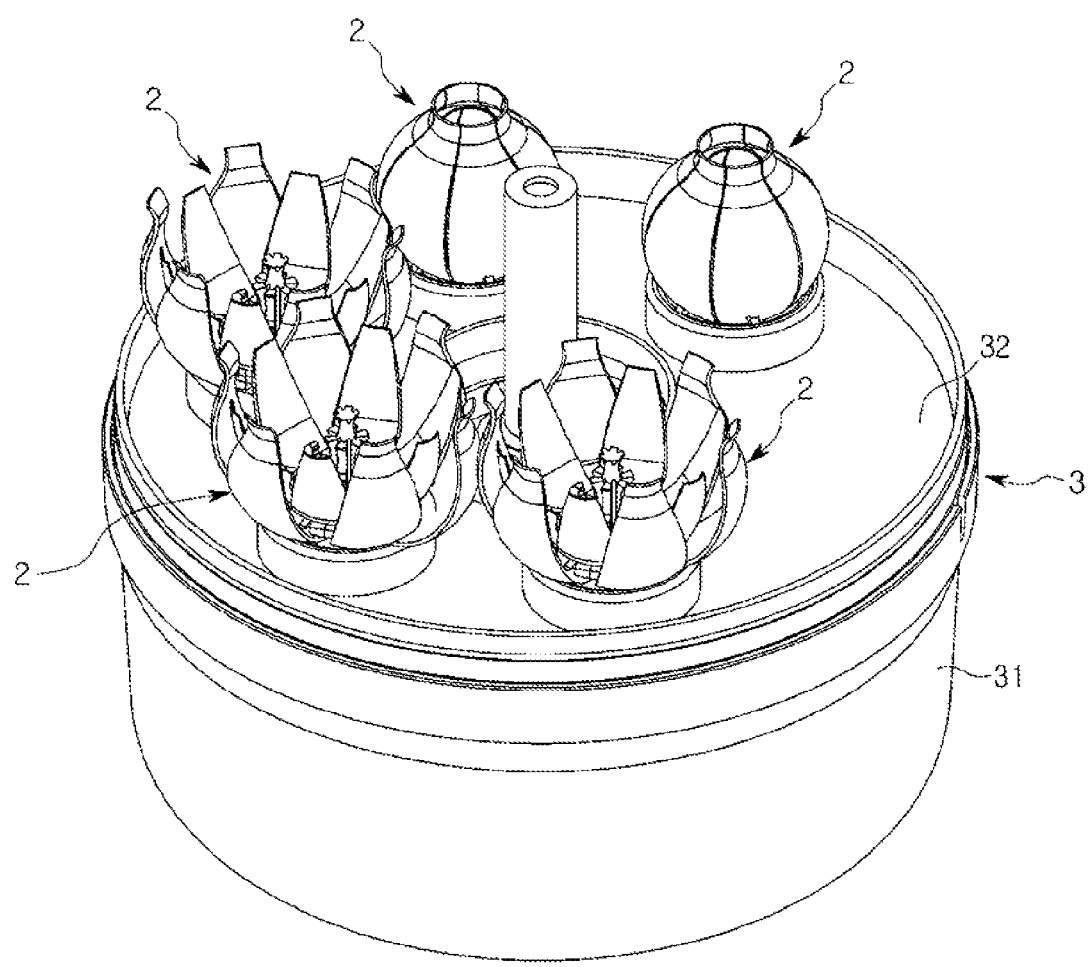
FIG. 32 is a perspective view illustrating a state in which flowers of some indicators are bloomed in the water storage unit to which the indicators according to the second embodiment of the present disclosure have been applied.
Figure 33:
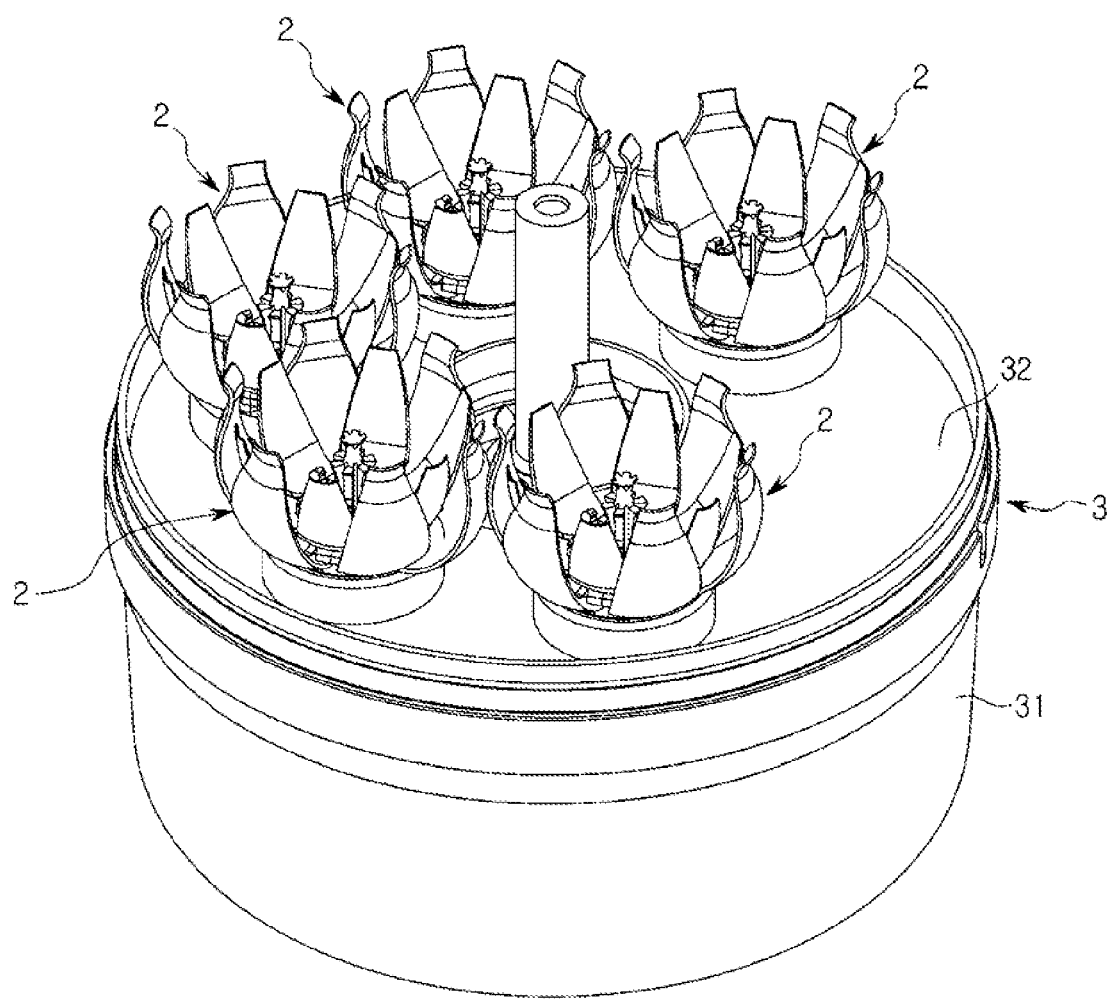
FIG. 33 is a perspective view illustrating a state in which flowers of all indicators are bloomed in the water storage unit to which the indicators according to the second embodiment of the present disclosure have been applied.

Consequently, as water is filled in the water bottle 31 and the water level rises, the stems 21 move upward in order by a buoyant force acting on the buoyant bodies 23 installed at the bottoms of the stems 21, and the flowers 22 installed at the tops of the stems also move upward. When the outer surfaces of the first petals 221 are spaced apart from the support units 322 as the flowers 22 move upward, the first petals 221 rotate outward with respect to the first hinge portions 212a by the self-load, and the second petals 222 that have been supported at the first petals 221 through the interlocking protrusions 222b also rotate outward by the self-load. Consequently, the flowers 22 bloom in order as shown in FIG. 32 and FIG. 33.

In addition, as the water in the water bottle 31 is used and the water level lowers, the stems 21 move downward in order, and the flowers 22 installed at the tops of the stems 21 also move downward. When the flowers 22 move downward, the first petals 221 rotate inward since the outer surfaces of the first petals 221 are supported by the support units 322, and the second petals 222 receive a force from the first petals 221 through the interlocking protrusions 222b and rotate inward. Consequently, the flowers 22 are closed in order.

Since a number of bloomed flowers 22 change in accordance with the water level in the water bottle 31 as above, the water level in the water bottle 31 may be checked by the number of bloomed flowers 22.

In the present embodiment, although the indicators 2 include the buoyant bodies 23 and vertically move by the buoyant force acting on the buoyant bodies 23, embodiments are not limited thereto, and the indicators may include a separate driving device such as a driving motor and vertically move by the power generated in the driving device.

In addition, although the indicators are formed including stems and flowers in the above embodiments, embodiments are not limited thereto.

Figure 34:
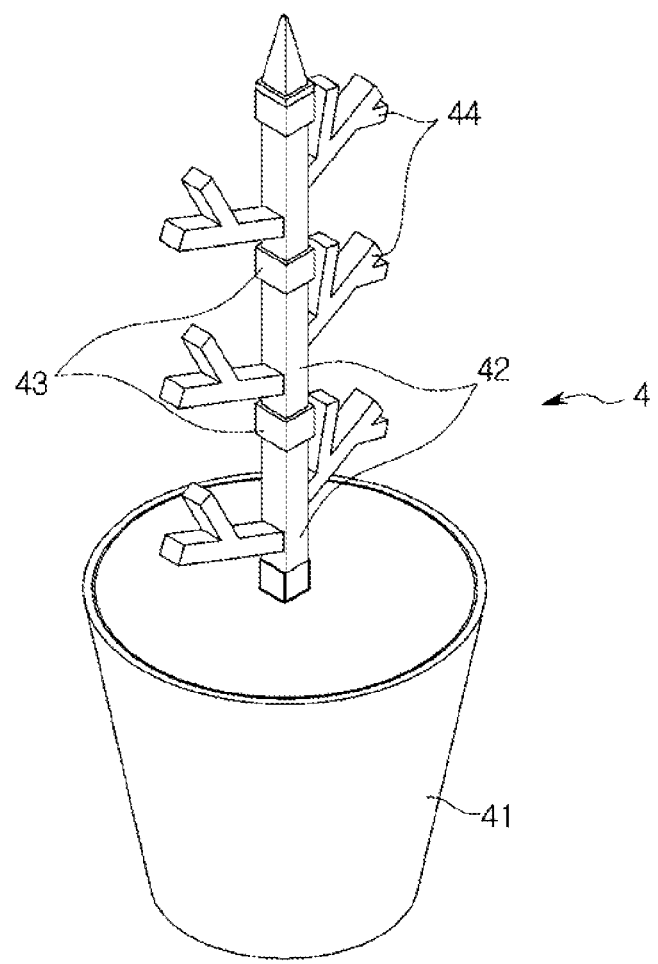
FIG. 34 is a perspective view of an indicator according to a third embodiment of the present disclosure.

As illustrated in FIG. 34, an indicator 4 according to a third embodiment of the present disclosure may include boughs 44 instead of flowers.

In the present embodiment, the indicator 4 includes a flowerpot 41, a plurality of stems 42 vertically disposed on the flowerpot 41 in order, and a plurality of joints 43 disposed between the stems 42 to enable the stems 42 to be rotatably coupled to each other, wherein the stems 42 include the boughs 44 branched out and extending from the stems 42.

The stems 42 and the boughs 44 are formed of light guiding members of a transparent or semi-transparent material to guide light, and a light source (not shown) such as a light-emitting diode is included in the joints 43 to supply light to the stems 42 and the boughs 44.

Consequently, by supplying the light though the light source from the stem 42 positioned at a lower side to the stem 42 positioned at an upper side in order as a condition value transmitted to the indicator 4 becomes closer to the optimum condition value, an effect similar to growing of a plant may be shown. In addition, by blocking the light though the light source from the stem 42 positioned at the upper side to the stem 42 positioned at the lower side in order as the condition value transmitted to the indicator 4 becomes farther from the optimum condition value, an effect similar to withering of the plant may be shown.

In the present embodiment, although the light source is disposed at the joints 43 to supply the light to the stems 42 and the boughs 44 connected to the stems 42 at the same time, this is merely an example, and separately supplying the light to the boughs is also possible. In addition, although not shown, flowers may be disposed at the boughs and the light may be supplied to the flowers in order as the transmitted condition value becomes closer to the optimum condition value, thereby displaying conditions such as a humidity level or a temperature.

According to the wireless controller in accordance with the disclosed embodiments, a user may intuitively recognize whether a user's command has been performed through a motion of an indicator, a voice output of a speaker, or a display of an image or a text of a display unit.

In addition, by configuring the wireless controller to have a plant-like exterior in accordance with the disclosed embodiments, the user may use a wireless controller that is more aesthetically pleasing and familiar to the user.

Hereinbefore, an embodiment of the present disclosure has been illustrated, but the present disclosure is not limited to the particular embodiment described above. Those of ordinary skill in the art to which the present disclosure pertains will be able to modify the embodiment in various ways without departing from the gist of the present disclosure claimed in the claims below, and the modified embodiments should not be separately understood from the technical spirit of the present disclosure.

What is claimed is:

1. A wireless controller comprising:
   a main body comprising a voice recognition unit:
   a control unit configured to generate a signal for controlling an external device, which signal is generated in accordance with a voice recognized in the voice recognition unit; and
   a communication unit configured to output the control signal generated in the control unit to the external device; and
   an indicator provided at the main body in a shape of a natural object, and configured to perform a motion corresponding to the voice recognized in the voice recognition unit.

2. The wireless controller according to claim 1, wherein the main body further comprises a speaker configured to output a sound in accordance with whether the control signal has been generated or the motion has been performed.

3. The wireless controller according to claim 2, wherein the speaker outputs a voice that signals compliance with a command in accordance with the voice recognized in the voice recognition unit.

4. The wireless controller according to claim 2, wherein the speaker outputs a voice that signals non-compliance with a command in accordance with the voice recognized in the voice recognition unit.

5. The wireless controller according to claim 1, wherein the indicator comprises a first indicator configured to show a motion corresponding to the voice recognized in the voice recognition unit, and a second indicator comprising a display device configured to show a motion corresponding to the voice recognized in the voice recognition unit and display an image corresponding to the voice recognized in the voice recognition unit.

6. The wireless controller according to claim 1, wherein the indicator comprises a first indicator configured to show a motion corresponding to the voice recognized in the voice recognition unit, and a second indicator comprising a support unit provided such that the display device configured to show a motion corresponding to the voice recognized in the voice recognition unit and display an image corresponding to the voice recognized in the voice recognition unit is detachable therefrom.

7. The wireless controller according to claim 1, wherein the indicator comprises a display device configured to display an image corresponding to the voice recognized in the voice recognition unit.

8. The wireless controller according to claim 7, wherein the display device displays, as an image or a text, whether the control in accordance with the voice has been performed or a result of the performance.

9. The wireless controller according to claim 7, wherein the display device displays an image or a text that indicates compliance with the command in accordance with the voice recognized in the voice recognition unit.

10. The wireless controller according claim 7, wherein the display device displays an image or a text that indicates non-compliance with the command in accordance with the voice recognized in the voice recognition unit.

11. The wireless controller according to claim 1, wherein the indicator is configured to receive a command for controlling the object to be controlled through a manipulation of the indicator in accordance with a predetermined manipulation method.

12. The wireless controller according to claim 11, wherein, when the command is input through the manipulation of the indicator, the control unit generates the control signal for controlling the object to be controlled in accordance with the input command.

13. The wireless controller according to claim 1, wherein the indicator shows a motion that indicates compliance with the command in accordance with the voice recognized in the voice recognition unit.

14. The wireless controller according to claim 1, wherein the indicator shows a motion that indicates non-compliance with the command in accordance with the voice recognized in the voice recognition unit.

15. The wireless controller according to claim 1, wherein the communication unit performs communication with the object to be controlled using one or more of wireless fidelity (Wi-Fi), Bluetooth, ZigBee, radio frequency (RF), and infrared (IR) communication methods.

16. The wireless controller according to claim 1, wherein the main body further comprises a sensor configured to detect information around the wireless controller.

17. The wireless controller according to claim 16, wherein the sensor comprises at least one of a temperature sensor, a humidity sensor, a dust sensor, a gas sensor, and an luminance sensor.

18. The wireless controller according to claim 16, wherein the control unit generates the control signal for controlling the object to be controlled based on information detected in the sensor.

19. The wireless controller according to claim 1, wherein the main body further comprises a main body display unit configured to display an image corresponding to the voice recognized in the voice recognition unit.

20. The wireless controller according to claim 19, wherein the main body display unit displays an image indicating whether the control of the external device in accordance with the voice has been performed or a result of the performing of the control of the external device.

21. The wireless controller according to claim 19, wherein the main body display unit displays an image indicating compliance with the command in accordance with the voice recognized in the voice recognition unit.

22. The wireless controller according to claim 19, wherein the main body display unit displays an image indicating non-compliance with the command in accordance with the voice recognized in the voice recognition unit.

23. The wireless controller according to claim 1, wherein the main body further comprises an extension terminal provided to connect the main body with an external device.

24. The wireless controller according to claim 1, wherein the main body is provided in a shape of a pot.

25. The wireless controller according to claim 1, wherein the indicator is provided in a shape of a plant.

26. The wireless controller according to claim 1, wherein the indicator is provided in a shape of at least one of a stem, a leaf, a flower, and a tree.

27. A method of controlling an external device using a hardware-based controller having a movable indicator, the method comprising:
    recognizing an input voice command using the controller;
    selecting a motion from a plurality of motions that the indicator is configured to perform, the indicator being configured to appear like a natural object;
    associating the selected motion with the recognized voice command and controlling the indicator to perform the selected motion, thereby indicating that the voice command has been recognized; and
    generating, using the controller, a control signal to control the external device to perform a task that corresponds to the recognized input voice command.

28. The method of claim 27, further comprising a second indicator provided in a the shape of a stem and including a support unit capable of mounting a display device wherein the second indicator is configured to move independently of the indicator,
    wherein the associating of the selected motion with the recognized voice command further comprises selecting a second motion from a plurality of motions that the second indicator is configured to perform and associating the selected second motion with the recognized voice command and controlling the second indicator to perform the selected second motion.

29. A wireless controller for controlling an external device, the wireless controller comprising:
    a voice recognizer to recognize an input voice command;
    a movable indicator configured to appear like a natural object;
    a hardware-based controller to select a motion from a plurality of motions that the indicator is configured to perform, to associate the selected motion with the recognized voice command, and to control the indicator to perform the selected motion, thereby indicating that the voice command has been recognized; and
    a communication unit to generate a control signal to control the external device to perform a task that corresponds to the recognized input voice command.

30. The wireless controller according to claim 29, wherein the hardware-based controller is configured to control the indicator to perform a second motion to indicate that the control signal to control the external device to perform the task has been generated.

* * * * *